United States Patent
Noon

(10) Patent No.: US 8,830,254 B2
(45) Date of Patent: Sep. 9, 2014

(54) SYSTEMS AND METHODS FOR GRAPH RENDERING

(75) Inventor: Ryan Noon, Mountain View, CA (US)

(73) Assignee: Ayasdi, Inc., Menlo Park, CA (US)

( * ) Notice: Subject to any disclaimer, the term of this patent is extended or adjusted under 35 U.S.C. 154(b) by 0 days.

(21) Appl. No.: 13/357,543

(22) Filed: Jan. 24, 2012

(65) Prior Publication Data

US 2013/0187941 A1 Jul. 25, 2013

(51) Int. Cl.
| | | |
|---|---|---|
| G09G 5/00 | (2006.01) | |
| G09G 5/02 | (2006.01) | |
| G06T 11/20 | (2006.01) | |
| G06T 1/00 | (2006.01) | |
| G06F 3/048 | (2013.01) | |
| G06T 11/60 | (2006.01) | |
| G06T 15/00 | (2011.01) | |

(52) U.S. Cl.
CPC ............ *G06T 11/60* (2013.01); *G06T 15/005* (2013.01); *G09G 5/02* (2013.01)
USPC ........... 345/589; 345/581; 345/440; 345/522; 345/683; 715/764

(58) Field of Classification Search
USPC ......... 345/418, 581, 589, 606, 440, 501, 522, 345/531, 545, 617–619, 660, 682–683; 715/200, 211, 273, 700, 713, 763–764, 715/800, 815; 717/144, 105
See application file for complete search history.

(56) References Cited

U.S. PATENT DOCUMENTS

| | | | |
|---|---|---|---|
| 5,734,268 A | 3/1998 | Bockelman | |
| 6,169,817 B1 | 1/2001 | Parker et al. | |
| 6,362,820 B1 | 3/2002 | Hoppe | |
| 6,583,787 B1 | 6/2003 | Pfister et al. | |
| 7,176,919 B2 | 2/2007 | Drebin et al. | |
| 7,202,877 B2 | 4/2007 | Olson | |
| 7,624,386 B2 * | 11/2009 | Robison | 717/144 |

(Continued)

FOREIGN PATENT DOCUMENTS

EP 0631251 12/1994

OTHER PUBLICATIONS

Civril, Ali et al., "SDE: Graph Drawing Using Spectral Distance Embedding," Proceedings of the 14th International Conference on Graph Drawing, pp. 30-41, Sep. 2006.

(Continued)

*Primary Examiner* — Wesner Sajous

(74) *Attorney, Agent, or Firm* — Sheppard Mullin Richter & Hampton

(57) ABSTRACT

An exemplary method comprises receiving graph data, generating an edge draw command to draw a first and a second edge as a display object, buffering first and second node positions for first and second sprites, respectively, identifying shader information associated with application of shading of the first sprite and the second sprite, the shader information indicating a change of shade based on distance from a first position and a change of shade based on distance from a second position associated with the second sprite, generating a node draw command to draw at least the first and second sprites, generating a graph shading command to apply shading to at least a portion of the first sprite based and to apply shading to at least a portion of the second sprite based, and providing the edge draw command, node draw command, and graph shading command to a graph execution module.

29 Claims, 21 Drawing Sheets

(56) References Cited

U.S. PATENT DOCUMENTS

| | | | |
|---|---|---|---|
| 8,355,864 | B2 | 1/2013 | Kida et al. |
| 2003/0076319 | A1 | 4/2003 | Hiraga |
| 2003/0174165 | A1* | 9/2003 | Barney .................. 345/747 |
| 2005/0035976 | A1 | 2/2005 | Ecob et al. |
| 2005/0228584 | A1 | 10/2005 | Adachi et al. |
| 2008/0094399 | A1 | 4/2008 | Heinkel et al. |
| 2009/0138188 | A1 | 5/2009 | Kores et al. |
| 2009/0238187 | A1 | 9/2009 | Guha et al. |
| 2010/0153870 | A1* | 6/2010 | Hoffmann .................. 715/767 |
| 2010/0302249 | A1 | 12/2010 | Fowler et al. |
| 2010/0313157 | A1 | 12/2010 | Carlsson et al. |
| 2011/0149100 | A1 | 6/2011 | Narabu |
| 2011/0208429 | A1 | 8/2011 | Zheng et al. |
| 2011/0251789 | A1 | 10/2011 | Sanders et al. |
| 2012/0136575 | A1 | 5/2012 | Samet et al. |
| 2012/0144372 | A1* | 6/2012 | Ceze et al. .................. 717/124 |
| 2012/0182298 | A1 | 7/2012 | Sun |
| 2012/0254153 | A1 | 10/2012 | Abraham et al. |
| 2012/0283948 | A1 | 11/2012 | Demiryurek et al. |
| 2013/0191416 | A1* | 7/2013 | Lee et al. .................. 707/771 |

OTHER PUBLICATIONS

Gajer, Pawel et al., "A Multi-Dimensional Approach to Force-Directed Layouts of Large Graphs," Special Issue on the 10th Fall Workshop on Computational Geometry, vol. 29, No. 1, pp. 3-18, Sep. 2004.

Kamada, Tomihisa et al., "An Algorithm for Drawing General Undirected Graphs," Information Processing Letters, vol. 31, No. 1, pp. 7-15, Apr. 12, 1989.

International Application No. PCT/US2013/022792, International Search Report and Written Opinion mailed Apr. 2, 2013.

International Application No. PCT/US2013/022803, International Search Report and Written Opinion mailed Apr. 2, 2013.

Grisetti, Giorgio et al., "A Tree Parameterization for Efficiently Computing Maximum Likelihood Maps using Gradient Descent," Proceedings of Robotics: Science and Systems, Jun. 27, 2007.

Hillier, Amy, "Working with ArcView 10," Jul. 14, 2011 [retrieved online at http://www.seas.upenn.edu/~ese502/extra_materials/ArcView_10_Manual.pdf on Dec. 11, 2013].

Kawarabayashi, Ken-Ichi et al., "Linear-Space Approximate Distance Oracles for Planar Bounded-Genus, and Minor-Free Graphs," Apr. 27, 2011 [retrieved online at http://citeseerx.ist.psu.edu/viewdoc/download?rep=rep1&type=pdf&doi=10.1.1.220.8700 on Dec. 11, 2013].

Mozes, Shay et al., "Exact Distance Oracle for Planar Graphs," May 11, 2011 [retrieved online at http://cs.brown.edu/~shay/oracle.pdf on Dec. 11, 2013].

Rojas, Raul,"Neural Networks: A Systematic Intoduction," Chapter 7: The Backpropagation Algorithm, pp. 151-184, Springer-Verlag, Berlin, 1996.

Sankaranarayanan, Jagan et al., "Query Processing Using Distance Oracles for Spatial Networks," Apr. 20, 2010 [retrieved at http://www.cs.umd.edu/~hjs/pubs/distance-oracle-tkde.pdf on Dec. 11, 2013].

Sommer, Christian et al., "Distance Oracles for Sparse Graphs," Proceedings of the 50th Annual IEEE Symposium on Foundations in Computer Science, pp. 703-712, Oct. 24, 2009.

Thorup, Mikkel et al., "Approximate Distance Oracles," Journal of the ACM, vol. 52, No. 1, pp. 1-24, Jan. 2005.

Van Ham, Franciscus Jacobus Johannes, "Interactive Visualization of Large Graphs," Ph.D. thesis, Eindhoven University of Technology, Nov. 21, 2005 [retrieved online at http://www.win.tue.nl/vis1/home/fvham/DL/thesis.pdf on Dec. 11, 2013].

Van Ham, Frank et al., "Interactive Visualization of Small World Graphs," Proceedings of the IEEE Symposium on Information Visualization, pp. 199-206, Oct. 10, 2004.

Xiong, Demin et al., "Semiautomated Matching for Network Database Integration," ISPRS Journal of Photogrammetry & Remote Sensing, vol. 59, pp. 35-46, Feb. 21, 2004.

Zhang, Meng, "Methods and Implementations of Road-Network Matching," Ph.D. thesis, Technical University of Munich, Oct. 14, 2009 [retrieved online at http://mediatum.ub.tum.de/doc/820125/820125.pdf on Dec. 11, 2013].

* cited by examiner

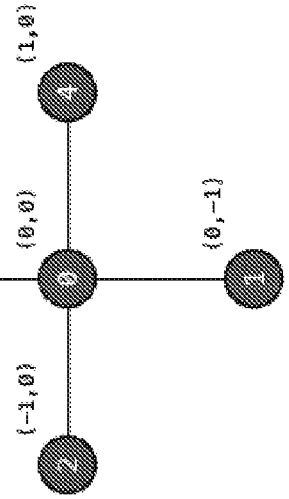

Node Index Array (Array A)
[0, 1, 2, 3, 4]
*There are five nodes, numbered 0-4. The node's number corresponds to the index of the node's 2D vertex in Array C.*

*This array can be bound with Array C and passed to glDrawElements to be drawn as the GL_POINTS primitive shape.*

Edge Index Array (Array B)
[0, 1, 0, 2, 0, 3, 0, 4]
*There are four edges. Each successive pair of numbers in this array corresponds to one edge. Thus, the edges are (0,1), (0,2), (0,3), and (0,4).*

*Each number in an edge's ordered pair corresponds to the 2D vertex index in Array C of each node the edge connects.*

*This array can be bound with Array C and passed to glDrawElements to be drawn as the GL_LINES primitive shape.*

Shared 2D Vertex Array (Array C)
[0.0, 0.0, 0.0, -1.0, -1.0, 0.0, 0.0, 1.0, 1.0, 0.0]
*This is a flattened array of 2D vertices. Each successive pair of numbers in this array corresponds to the ordered (x,y) position of a node in the graph.*

*This array is stored in fast GPU memory and can be referenced by both the node and edge index arrays (Array A and Array B) to quickly and efficiently draw very large graphs.*

FIG. 14

SYSTEMS AND METHODS FOR GRAPH RENDERING

BACKGROUND

1. Field of the Invention

The present invention generally relates to display rendering. More particularly, the invention relates to systems and methods for graph rendering.

2. Description of Related Art

As the amount and complexity of data increases, there is a need to better explain the data content and as well as potential relationships suggested by the data. One way in which massive data may be described is through the use of graphs. A graph is any visual representation of information or of relationships between quantities, qualities, or sets of data.

A popular graph used to depict data is the force-directed layout graph. The force-based or force-directed graph utilizes force-directed algorithms for drawing graphs in an aesthetically pleasing way. One of the goals for the force-directed algorithm is to lay out the graph in a manner that is comprehensible to the user so that the user can identify components as well as at least some information regarding relationships in the data. In a force-directed layout, the graph generally positions nodes in two-dimensional or three-dimensional space so that all or most of the edges are of equal length and there are as few crossing edges as possible. Forces may be assigned among the sets of edges and the set of nodes. In one example, the forces assigned to the edges act as springs. In other examples, the nodes may act as electrically charged particles.

Unfortunately, as the amount and the number of dimensions of the data grow, the layout of the graph becomes increasingly complex, slow, and computationally expensive. A bad layout may take a long time to draw and may hide or obscure information or relationships thereby rendering the graph ineffective.

Further, existing systems do not scale. The number of computations in existing systems increases dramatically as the number of nodes increases. For example, the number of computations may be N*N for every N number of nodes. As a result, as the amount of data that must be graphed increases, the graphical layout process may slow to the point that the process is no longer useable. Further, existing systems tend to render obscure, non-optimal layouts as the amount of data and/or dimensions increase.

Once a graph layout is determined (e.g., the positions of nodes and edges has been calculated), the graph is displayed. In the prior art, individual, imperative commands are made to construct graphs. For example, a graph may be depicted as a combination of nodes, which may be displayed as balls, and edges, which may be displayed as lines between the balls. In the prior art, separate commands are generated to draw each edge and each node. Further, separate commands are required to color each of the nodes. As a result, as the number of nodes and edges of the graph increase, the number of required commands to draw and color the graph also increases linearly. Once the number of nodes and edges becomes too high, the process of drawing the graph slows and useable performance may be lost. Consequently, many graphs that represent large amounts of data of sufficient complexity require powerful hardware (e.g., computers with state of the art graphic card(s), cutting edge processor(s) with multiple cores, and considerable memory). If the graph is too complex, the graph may not be able to be rendered at all within a reasonable time.

FIGS. 12a-12b depict a process of rendering a graph consisting of nodes coupled by edges to form a ring in the prior art. FIG. 12a depicts a graph 1200 wherein edges 1208-1216 are individually drawn in the prior art. A separate command is generated and sent to a graphic card for each edge. In this example, a command is generated to draw edge 1208. The command is then provided to the graphic card which may then draw the edge. Subsequently, the process continues by generating and providing separate commands for individual edges 1210, 1212, 1214, and 1216, respectively. After generation, each command is separately provided to the graphic card. Upon receiving each command, the graphic card will perform the individual command. FIG. 12a depicts an incomplete graph where additional individual commands to draw each unfinished edge, respectively, will be required.

FIG. 12b depicts a graph 1202 wherein edges have been completed and nodes 1218-1224 are individually drawn in the prior art. In the prior art, each node is individually drawn as a mesh (e.g., a polygon mesh). As a result, each node 1218-1224 is individually drawn by separate commands. For example, a command is generated to draw node 1218. The command is then sent to the graphic card. Subsequently, separate commands are generated to draw each node 1220, 1222, and 1224, respectfully. After generation, each command is separately provided to the graphic card. FIG. 12b depicts an incomplete graph where additional individual commands to draw each unfinished node, respectively, will be required.

FIG. 12c depicts a graph 1204 wherein edges and nodes have been completed and nodes 1226-1232 are individually colored in the prior art. For example, node 1226 may be colored once a command to fill the mesh (e.g., fill faces of the polygons associated with the drawing of node 1226) is generated and provided to the graphic card. Separate commands are required to color each individual node 1226-1232. Upon receiving each command, the graphic card may fill each node in turn. FIG. 12c depicts an incomplete graph where additional individual commands to fill each unfinished node, respectively, will be required.

FIG. 12d depicts a finished graph 1206 after separate commands have been generated for each component of the graph 1206 in the prior art. Graph 1206 depicts a circular graph consisting of colored nodes and connecting edges. Those skilled in the art will appreciate that the shape, number of nodes, and complexity of the graph 1206 are fairly trivial. As the number and position of nodes and edges increase, however, the number of individual commands and individual actions necessary to draw the graph dramatically increase. As a result, performance may slow to the point where displaying the graph cannot be performed in a reasonable time.

Further, as the complexity of the graph grows, inconsistent changes or details that may otherwise be included in the graph are not longer practical. For example, changes in size and different colors of the nodes may require additional resources which may not be available.

SUMMARY OF THE INVENTION

Exemplary systems and methods for graphical layout are discussed. An exemplary method comprises receiving graphical data associated with points and edges, selecting a first predetermined number of points of the received graphical data, determining an initial distance between each of the first predetermined number of points, generating a fast approximate distance oracle comprising identifiers for at least a plurality of points of the received graphical data and oracle distances between at least one point associated with an identifier and at least one other point, the oracle distances including the initial distance between any of the first predetermined number of points, selecting a second predetermined number of points of the graphical data, determining a graphical distance for each of the second predetermined number of points relative to other points of the first and second predetermined number of points utilizing, at least in part, the fast approximate distance oracle, calculating a potential error between the determined graphical distance and a topologic distance between each of the second predetermined number of points and the first predetermined number of points and calculating a potential error between the determined graphical distance and a topologic distance between each of the second predetermined number of points and the other second predetermined number of points, approximating a correction for at least one of the second predetermined number of points based on at least one of the calculated potential errors, adjusting a position of the at least one of the second predetermined number of points based on the calculated graphical distance and the correction, and displaying the at least one of the second predetermined number of points.

In some embodiments, generating the fast approximate distance oracle occurs simultaneously or near-simultaneously with determining the initial distance for each of the first predetermined number of points relative to other points of the first predetermined number of points. Alternately, generating the fast approximate distance oracle may occur prior to determining the initial distance for each of the first predetermined number of points relative to other points of the first predetermined number of points.

Selecting the first predetermined number of points may comprise selecting each point of the first predetermined number of points based, at least in part, on the initial distance between points identified in the graphic data. Alternately, selection the first predetermined number of points may comprise selecting each point of the first predetermined number of points randomly from the received graphic data.

In various embodiments, calculating the potential error between the graphical distance and a topologic distance comprises determining the KK potential between at least one of the second predetermined number of points and the first predetermined number of points. Approximating the error correction for at least one of the second predetermined number of points may comprise calculating a gradient descent to minimize the KK potential.

The method may further comprise identifying a first subset of antigravity points associated with the at least one point of the second predetermined number of points, identifying edges associated with the at least one point of the second predetermined number of points, calculating forces associated with the first subset of antigravity points and forces associated with the edges that act upon the at least one point of the second predetermined number of points, and adjusting the position of the at least one point of the second predetermined number of points based on the force calculation. Further, the method may comprise identifying a second subset of antigravity points associated with at least one other point of the second predetermined number of points, identifying edges associated with the at least one other point of the second predetermined number of points, calculating forces associated with the second subset of antigravity points and forces associated with the edges that act upon the at least one other point of the second predetermined number of points, and adjusting the position of the at least one other point of the second predetermined number of points based on the force calculation.

The first subset of antigravity points comprises at least one point that is not a member of the second subset of antigravity points. In some embodiments, none of the points of the first subset of antigravity points are coupled to the at least one point of the second predetermined number of points by an edge.

An exemplary system may comprise data acquisition module, a point selection module, a hierarchical model module, a distance correction module, and a layout module. The data acquisition module may be configured to receive graphical data associated with points and edges. The point selection module may be configured to select a first predetermined number of points of the received graphical data and to select a second predetermined number of points of the graphical data. The hierarchical model module may be configured to determine an initial distance between each of the first predetermined number of points and to generate a fast approximate distance oracle comprising identifiers for at least a plurality of points of the received graphical data and oracle distances between at least one point associated with an identifier and at least one other point, the oracle distances including the initial distance between any of the first predetermined number of points. The distance correction module may be configured to determine a graphical distance for each of the second predetermined number of points relative to other points of the first and second predetermined number of points utilizing, at least in part, the fast approximate distance oracle, to calculate a potential error between the determined graphical distance and a topologic distance between each of the second predetermined number of points and the first predetermined number of points and calculating a potential error between the determined graphical distance and a topologic distance between each of the second predetermined number of points and the other second predetermined number of points, to approximate a correction for at least one of the second predetermined number of points based on at least one of the calculated potential errors, and to adjust a position of the at least one of the second predetermined number of points based on the calculated graphical distance and the correction. The layout module may be configured to display the at least one of the second predetermined number of points.

An exemplary computer readable medium may comprise instructions. The instructions may be executable by a processor for performing a method, the method comprising receiving graphical data associated with points and edges, selecting a first predetermined number of points of the received graphical data, determining an initial distance between each of the first predetermined number of points, generating a fast approximate distance oracle comprising identifiers for at least a plurality of points of the received graphical data and oracle distances between at least one point associated with an identifier and at least one other point, the oracle distances including the initial distance between any of the first predetermined number of points, selecting a second predetermined number of points of the graphical data, determining a graphical distance for each of the second predetermined number of points relative to other points of the first and second predetermined number of points utilizing, at least in part, the fast approximate distance oracle, calculating a potential error between the determined graphical distance and a topologic distance between each of the second predetermined number of points and the first predetermined number of points and calculating a potential error between the determined graphical distance and a topologic distance between each of the second predetermined number of points and the other second predetermined number of points, approximating a correction for at least one of the second predetermined number of points based on at least one of the calculated potential errors, adjusting a position of the at least one of the second predetermined number of points based on the calculated graphical distance and the correction, and displaying the at least one of the second predetermined number of points.

Exemplary systems and methods to render graphs are also discussed. An exemplary method may comprise receiving graph data identifying nodes and edges to graph, generating an edge draw command to draw at least a first and a second edge as at least a part of a display object based on the received graph data, buffering, from the received graph data, a first node position and a second node position for a first sprite associated with the first node position and a second sprite associated with the second node position, identifying shader information associated with application of shading at least a portion of the first sprite and at least a portion of the second sprite, the shader information indicating a change of shade based on distance from a first position associated with the first sprite and a change of shade based on distance from a second position associated with the second sprite, generating a node draw command to draw at least the first and second sprites based on the buffered first and second node positions, generating a graph shading command, based at least in part on the received shader information, to apply shading to at least the portion of the first sprite based, at least in part, on distance from the first position associated with the first sprite and to apply shading to at least the portion of the second sprite based, at least in part, on distance from the second position associated with the second sprite, and providing the edge draw command, node draw command, and graph shading command to a graph execution module.

The method may further comprise displaying the first and second edges based on the edge draw command and displaying the first and second sprites based on the node draw command to display shading to the first sprite and the second sprite based on the graph shading command. The edge draw command may be generated after the node draw command.

In some embodiments, the graph shading command may be further to apply shading to at least the first edge and the second edge. The shader information may further indicate a change of shade based on a distance from a first position associated with the first edge and a change of shade based on a distance from a second position associated with the second edge. In various embodiments, the application of shading to the at least the first edge and the second edge produces a smoothing effect. The shader information may indicate a first color of the change of shade associated with the first edge and a second color of the change of shade associated with the second edge and the graph shading command may be further be to apply the first color of the change of shade associated with the first edge and a second color of the change of shade associated with the second edge.

The shader information may further indicate a first color of the change of shade associated with the first sprite and a second color of the change of shade associated with the second sprite and the graph shading command may be further to apply the first color of the change of shade associated with the first sprite and a second color of the change of shade associated with the second sprite. The shader information may indicate a glowing effect of shading associated with the first sprite and the second sprite while the graph shading command may further be to apply the glowing effect of shading associated with the first sprite and the second sprite.

In some embodiments, the method may further comprise identifying node size information from the received graph data, the node size information comprising a first size for the first node and a second size for the second node, wherein the shader information further indicating the change of shade associated with the first sprite is based, in part, on the first size for the first node and further indicating the change of shade associated with the second sprite, is based, in part, on the second size for the second node.

The edge draw command may further be a command to draw all edges identified in the graph data. The graph shading command may further be a command to apply shading to all sprites associated with every node identified in the graph data. The display object may be a mesh. The draw command the graph shading command may be the same command.

An exemplary system may comprise a graph data module and a command generation module. The graph data module may be configured to receive graph data identifying nodes and edges to graph. The command generation module may be configured to generate an edge draw command to draw at least a first and a second edge as at least a part of a display object based on the received graph data, to buffer, from the received graph data, a first node position and a second node position for a first sprite associated with the first node position and a second sprite associated with the second node position, to buffer shader information associated with application of shading at least a portion of the first sprite and at least a portion of the second sprite, the shader information indicating a change of shade based on distance from a first position associated with the first sprite and a change of shade based on distance from a second position associated with the second sprite, to generate a node draw command to draw at least the first and second sprites based on the buffered first and second node positions, and to generate a graph shading command, based at least in part on the received shader information, to apply shading to at least the portion of the first sprite based, at least in part, on distance from the first position associated with the first sprite and to apply shading to at least the portion of the second sprite based, at least in part, on distance from the second position associated with the second sprite and to provide the edge draw command, node draw command, and graph shading command to a graph execution module.

An exemplary computer readable medium may comprise instructions. The instructions may be executable by a processor for performing a method. The method may comprise receiving graph data buffering nodes and edges to graph, generating an edge draw command to draw at least a first and a second edge as at least a part of a display object based on the received graph data, identifying, from the received graph data, a first node position and a second node position for a first sprite associated with the first node position and a second sprite associated with the second node position, identifying shader information associated with application of shading at least a portion of the first sprite and at least a portion of the second sprite, the shader information indicating a change of shade based on distance from a first position associated with the first sprite and a change of shade based on distance from a second position associated with the second sprite, generating a node draw command to draw at least the first and second sprites based on the buffered first and second node positions, generating a graph shading command, based at least in part on the received shader information, to apply shading to at least the portion of the first sprite based, at least in part, on distance from the first position associated with the first sprite and to apply shading to at least the portion of the second sprite based, at least in part, on distance from the second position associated with the second sprite, and providing the edge draw command, node draw command, and graph shading command to a graph execution module.

BRIEF DESCRIPTION OF THE DRAWINGS

FIG. 14 is a diagram of a node index array, and edge index array, and a shared 2D vertex array that may be used by the rendering engine in some embodiments.

DETAILED DESCRIPTION OF THE INVENTION

An effective graph layout may improve the understandability of the information represented by the graph and may be computationally efficient. An exemplary layout of a graph may include two stages including the initial layout and the layout over time. The initial layout may include the determination of initial positions of one or more nodes and edges. The initial layout may be computationally derived and/or displayed. Over time, the positions of the nodes and edges may change (e.g., expand) in a manner similar to a force-directed layout.

In some embodiments, the initial layout may approximate the final layout (e.g., the graphical layout over time). Although the process of the initial layout may be more computationally expensive due to the approximation, the speed in which a stable or semi-stable layout is achieved may be reasonably fast. Further, by approximating the layout over time, the initial layout may not include positions of balls and edges that may easily lead to tangles or saddle points. As a result, the layout over time may be more easily understood and useable by a user.

Figure 1:
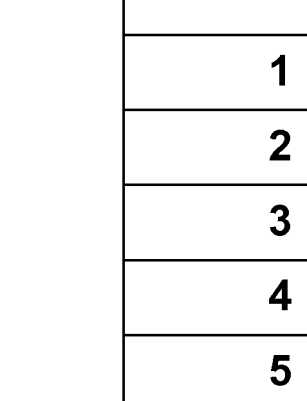
FIG. 1 is a table of data for a force-directed graph in some embodiments.

FIG. 1 is a table 100 of data for a force-directed graph in some embodiments. The table may be used to create a graph such as, but not limited to, a force-directed layout. The table 100 may contain data that identifies nodes and edges. In one example, the table 100 comprises vertices and adjacent vertices. The vertices may be a point at which a node is located. The adjacent vertices may indicate other nodes coupled with the first vertices. For example, in table 100, the node of vertices 1 may be coupled to nodes at vertices 2 and 10 (e.g., node 1 may be coupled to node 2 and 10 by separate edges).

A node may be a graphical representation of data. In some embodiments, the node may be represented as a ball, point, or any other shape on a graph. The edge may be graphically represented as a line or any other shape that may connect two nodes. In one example, a graph that depicts two nodes coupled by an edge may suggest a relationship between the nodes.

A node may represent a subset of data points that share a characteristic or property. The size of the node may represent the number of data points (e.g., a large node may indicate that the node represents many different data points). Color of the node may also represent a shared property or characteristic of the data associated with the node. An edge between nodes may indicate that the nodes share data points.

For example, one of many nodes may be associated with information associated with cancer survivors. A first node may indicate a gene expression for a group of cancer survivors while a second node may indicate a different gene expression for the same group. If the two nodes are connected by an edge, some of the cancer patients may demonstrate both gene expressions (e.g., each node includes the same patient that has both characteristics). The size or color of the node and/or edge may represent the number of shared data characteristics (e.g., the size of the edge suggests the number of shared patients between the two nodes).

Although a table is depicted within FIG. 1, those skilled in the art will appreciate that any data structure (e.g., table, queue, or database) or combination of data structures may be used. Further, although only two columns are depicted in FIG. 1, there may be any number of columns or dimensions of data that may be graphed.

Figure 2A:
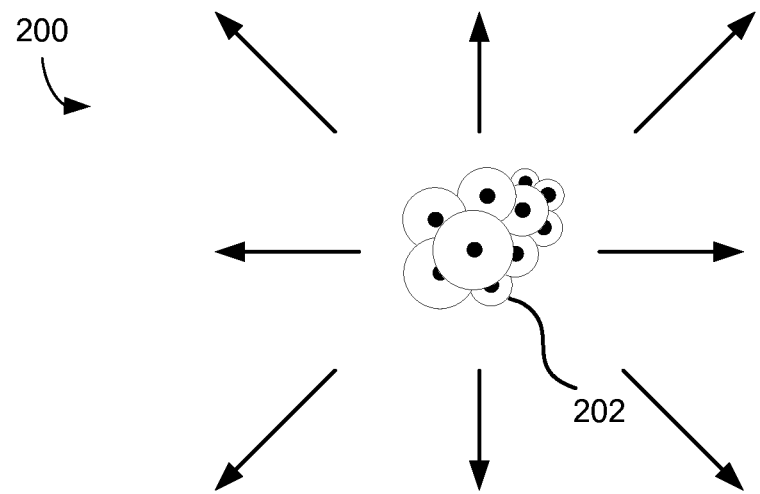
FIG. 2a depicts an initial graph layout of a force-directed graph of a circle in the prior art.
Figure 2B:
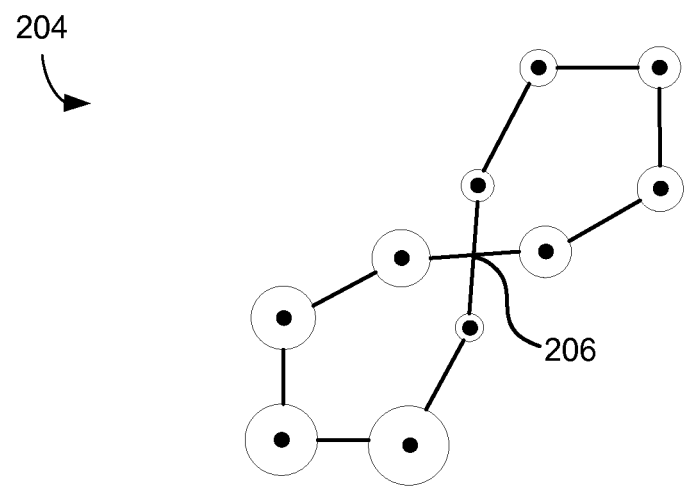
FIG. 2b depicts a final graph layout of the force-directed graph of the circle in the prior art.

FIGS. 2a and 2b depict an initial graph and a final graph of data that ideally should be represented as a circle. Although this case may be considered somewhat trivial, the problems associated with time, tangles, and instability increase as the number of nodes and edges increase.

FIG. 2a depicts an initial graph layout 200 of a force-directed graph of a circle in the prior art. Many existing layout methodologies initially graph all balls of a force-directed graph in a similar overlapping position 202. In a force-directed graph, edge forces (e.g., the lines connecting the balls) should push apart the balls after the initial position.

For example, each edge may be associated with a force similar to a spring which pushes connected balls apart when the balls are too close or pull the connected balls together when the balls are too far away. For example, the forces an edge works upon two adjoined balls may function as subject to Hooke's law of elasticity. As such, after the initial layout where balls with connecting edges overlap, the forces of the edges force the balls apart towards a broader graph (see FIG. 2b).

The process of adjusting the graph from the initial position 202 to a "final" position may be time consuming because each ball must travel to the final position. Further, the movement of each ball may influence the movements of other balls that are coupled via an edge. By starting all of the nodes and edges in a single position, graphs may be displayed over time which are not optimal and may lead to instable configurations. For example, certain balls and edges may be twisted such that the forces of the edges are unable to "untangle" the graph. Moreover, starting the graph with all of the balls in a similar position may lead one or more balls or groups of balls continuously swinging between two or more semi-stable positions (e.g., if there are saddle points in the potential function for the graph layout for that data).

FIG. 2b depicts a final graph layout 204 of the force-directed graph of the circle in the prior art. The final graph layout 204 may begin as the initial graph layout 200 of FIG. 2a. In this example, the final graph should represent a circle, however, since the balls began in a single position (as depicted in FIG. 2a), the circle is twisted at point 206.

As discussed herein, the graph represented in FIGS. 2a and 2b are simple shapes. A more complex graph may include hundreds or thousands of such shapes. Simple tangles and saddle points that appear in "toy" examples may lead to complex tangles that obscure data and relationships.

Figure 3A:
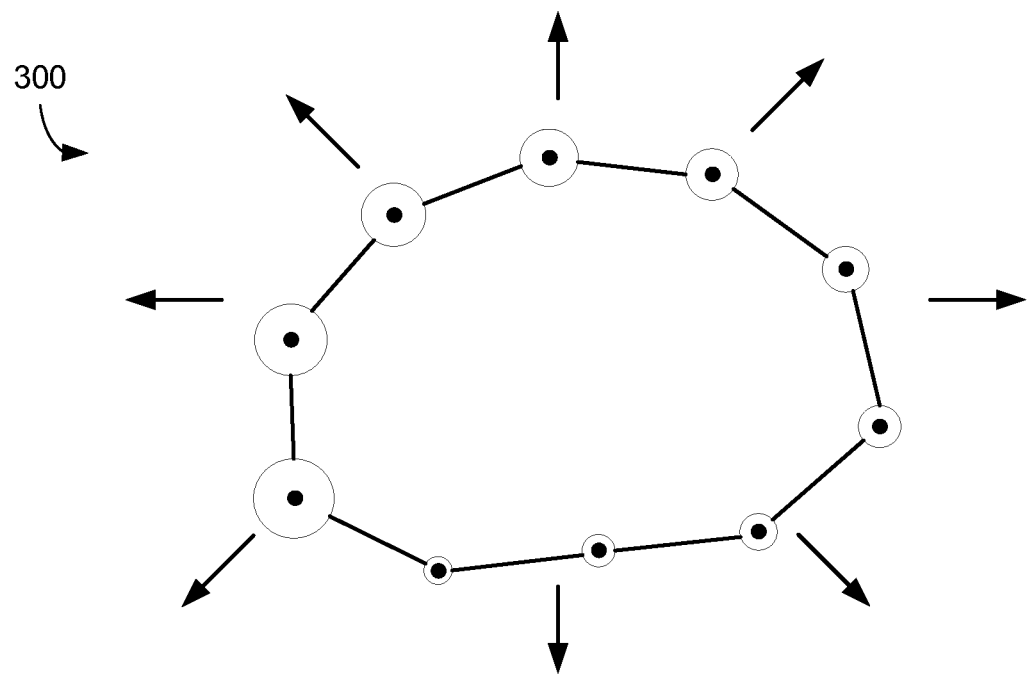
FIG. 3a depicts an initial layout of a graph of a circle in some embodiments.
Figure 3B:
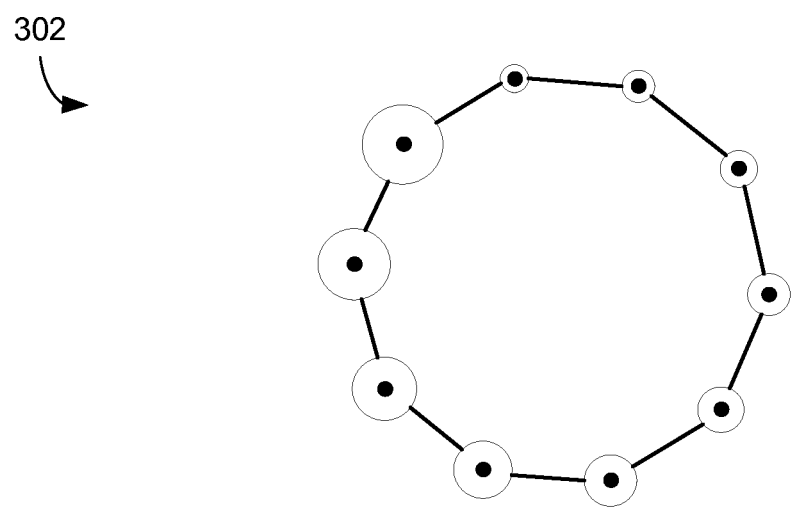
FIG. 3b depicts a layout of the graph of a circle over time in some embodiments.

Like FIGS. 2a and 2b, FIGS. 3a and 3b depict an initial graph and a final graph for data that ideally may be represented as a circle. Unlike FIGS. 2a and 2b, however, FIG. 3a depicts an initial graph that is created by approximating, in some embodiments, the solution as depicted in FIG. 3b. Since the solution is approximated, the balls of the initial layout may approximate the balls of a layout over time. Because the balls are close to their final position, less time may be required to adjust the position of the balls to reach the final layout when compared to the initial layout 202 of FIG. 2a of the prior art. Further, there may fewer tangles and instable results since the balls and/or edges are less apt to overlap in the initial graph.

FIG. 3a depicts an initial layout 300 of a graph of a circle in some embodiments. The final layout (e.g., layout over time) of the graph may be approximated in order to increase the speed of obtaining the final layout, reduce potential tangles, are reduce the possibility of an instable position. For example, rather than an initial layout wherein all balls are placed in a similar position (see FIG. 2a), the initial graph layout 300 may begin with balls in a generally circular shape which approximates the final shape as depicted in FIG. 3b.

In various embodiments, the initial layout may be computationally efficient. Further, in some embodiments, the time required to complete or approximate the final graph may be less when compared to starting all of the balls at a single position. The edges in the initial graph layout may push the balls farther apart thereby attaining the position of FIG. 3b.

FIG. 3b depicts a layout 302 of the graph of a circle over time in some embodiments. For example, once the initial graph layout 300 is rendered, the edges may push the balls to the final graph (i.e., a circle). Those skilled in the art will appreciate that the "final" graph is a graph or layout of nodes over time. The nodes and/or edges may continue to move relative to each other once the shape in FIG. 3b is obtained. Movements, however, may be minor or not noticeable. In some embodiments, the "final" graph comprises the layout of the graph over a predetermined period of time.

The time to push the initial graph layout 300 to the graph layout 302 may be shorter than the time to push all of the balls from a similar, overlapping position to a final position. Those skilled in the art will appreciate that even though the computation of the initial graph layout 300 may be greater than starting all balls on the same position, by approximating the layout of the graph over time, the time required to reach the graph layout 302 may be comparatively shorter. As a result, the time to adjust the graph to improve usability, access, and intractability may be reasonable while the time required to adjust an initial overlapping position may be too long (e.g., hours or more).

Those skilled in the art will appreciate that a user may understand information regarding the graph and the underlying data even if the layout over time has not yet been reached. For example, a user may view the initial layout and understand that, over time, the layout is likely to obtain a circular shape. With the information, the user may choose to interact with the graph (change the shape of the graph), retrieve information associated with one or more nodes, and/or analyze the underlying data.

In some embodiments, tangles and instability are avoided by approximating the final graph. For example, the twist at point 206 identified in FIG. 2b is unlikely since the balls and edges in the initial graph layout 300 are expanded and, as such, do not cross. Although the examples depicted in FIGS. 3a and 3b are simple, those skilled in the art will appreciate that approximating the final layout reduces overlap of balls as well as edge crossovers which reduce tangles and instability in larger, more complex structures.

Figure 4A:
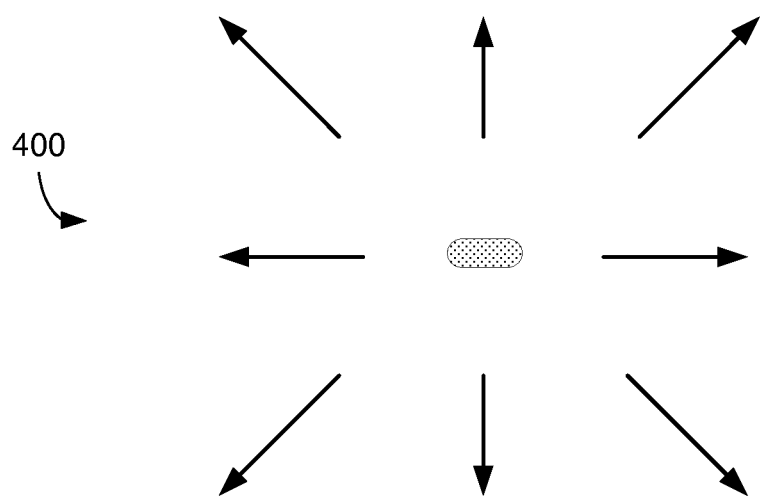
FIG. 4a depicts an initial layout of a force-directed graph representing a "blanket" of data in the prior art.
Figure 4B:
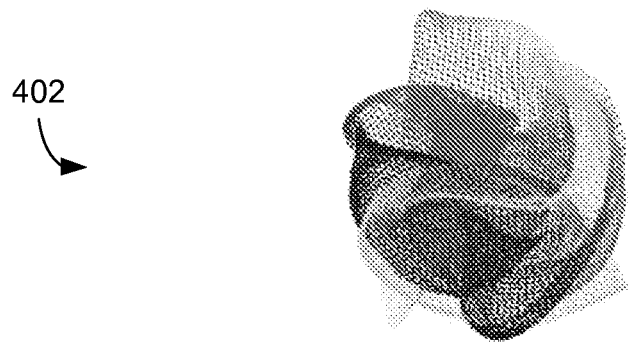
FIG. 4b depicts a layout of the force-directed graph of data over time in the prior art.
Figure 5A:
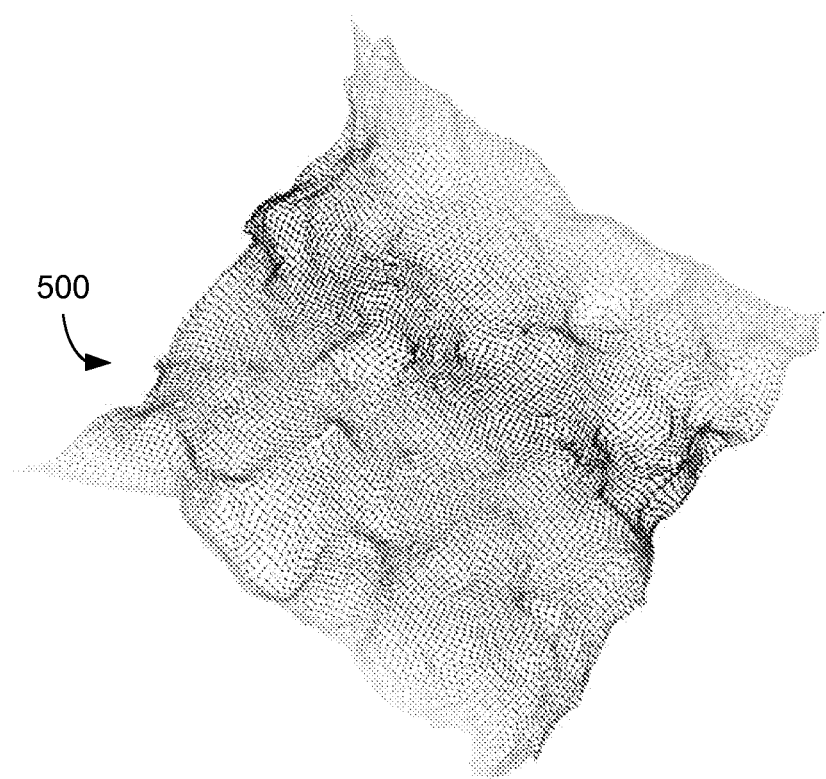
FIG. 5a depicts an initial layout of a graph representing a "blanket" of data in some embodiments.
Figure 5B:
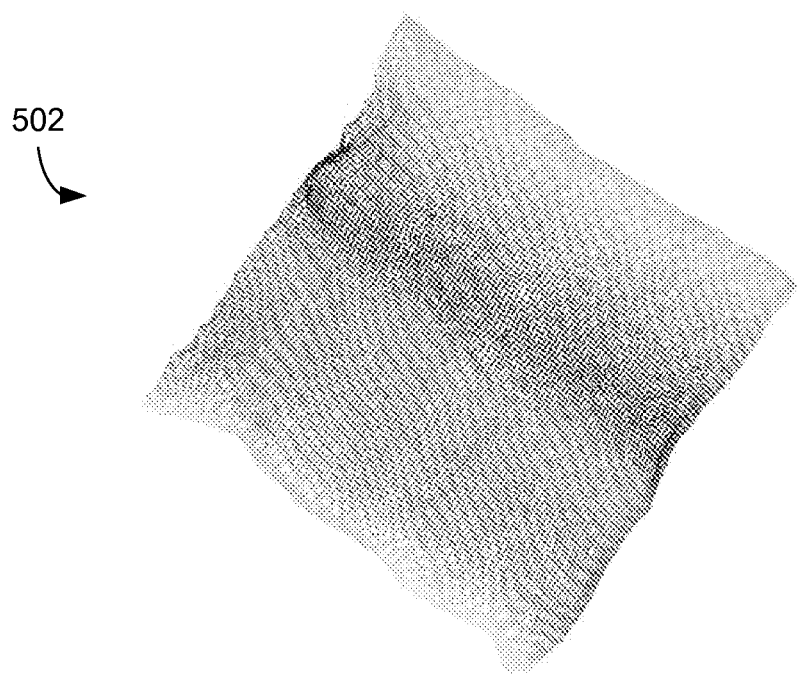
FIG. 5b depicts a layout of the graph representing the "blanket" of data over time in some embodiments.

FIGS. 4a and 4b of the prior art demonstrate how large amounts of associated data may not be reliably depicted. Since the initial layout of all points may begin at a similar position, a large number of balls and edges may ultimately become tangled and/or settle in positions that are not optimal. FIGS. 5a and 5b, in contrast with FIGS. 4a and 4b, show the initial layout and layout over time in some embodiments, where a improved representation is obtained.

FIG. 4a depicts an initial graph layout 400 of a force-directed graph representing a "blanket" of data in the prior art. The blanket of data is represented as a large number of balls that are coupled together and may represent a rectangular shape. All of the balls of the blanket data may begin at roughly one position in the prior art. The position will then expand as the forces of the edges push the balls apart. Due to the amount of data and complexity of the edge connections, the process of expansion may be time consuming and lead to tangles which, in turn, may need time to resolve.

FIG. 4b depicts a graph layout 402 of the force-directed graph of data over time in the prior art. The blanket of data in graph layout 402 is depicted as twisted and tangled. The length of time required by prior art systems to depict a stable graph in which the depiction may be usable increases with the amount and/or complexity of the data.

For example, the position of all balls in the prior art is constantly recalculated based on the forces provided by the edges. As the positions change, the forces change and, therefore, require constant updating. As a result, the process of the prior art is computationally inefficient and time consuming.

Further, since all the balls are being recalculated and moved simultaneously, balls are constantly moving into positions that are ultimately unstable or non-optimal. As a result, the balls either must waste computational cycles moving to positions that must be corrected (e.g., potentially moving the ball back to its initial position as the rest of the balls continue to move) or the balls end up in semi-stable tangles (e.g., saddle points).

In order to keep one or more balls from swinging between two or more semi-stable positions, many algorithms in the prior art limit a number of iterations of movement between the two semi-stable positions. As a result, instead of trying to solve the problem and change the graph into a more optimal layout, the prior art often depicts the graph with tangles and/or semi-stable positions as being "good enough."

FIG. 5a depicts an initial layout 500 of a graph representing a "blanket" of data in some embodiments. In various embodiments, a graph layout engine may receive the graphic data and approximate an intermediate or final solution for initial layout 500. The initial layout 500 depicts a "wrinkled blanket" which may be expanded as the forces of the edges force related balls to expand. Since the initial layout 500 approximates the intermediate or final layout, the process of expansion may be quicker when compared to the prior art. Further, since not all balls are beginning at the same position, there are fewer, if any, balls to untangle. Moreover, there are fewer semi-stable tangles since a majority of the balls of the initial layout may be in a general intermediate or final position.

As a result, the process of completing the graph and applying forces from the edges on the balls is computationally efficient, may be faster than the prior art, and may lead to improved results.

FIG. 5b depicts a layout 502 of the graph representing the "blanket" of data over time in some embodiments. The layout 502 is not necessarily a "final" graph because the balls may continue to move and make corrections. Over time, however, the "blanket" may begin as depicted in the initial layout 500 and may then expand and/or organize to the "blanket of data" depicted in layout 502.

Those skilled in the art will appreciate that FIGS. 3a, 3b, 5a, and 5b, may be simple examples. As the complexity of the data increases, a graph to be depicted may include many circles as depicted in FIGS. 3a and 3b and/or many blankets as depicted in FIGS. 5a and 5b. Further, the layout over time may not be symmetric but may be dependant upon the data to be graphed.

Exemplary engines and methods of initial layout and adjustment of the initial layout over time are further discussed in FIGS. 6-9 in more detail.

Figure 6:
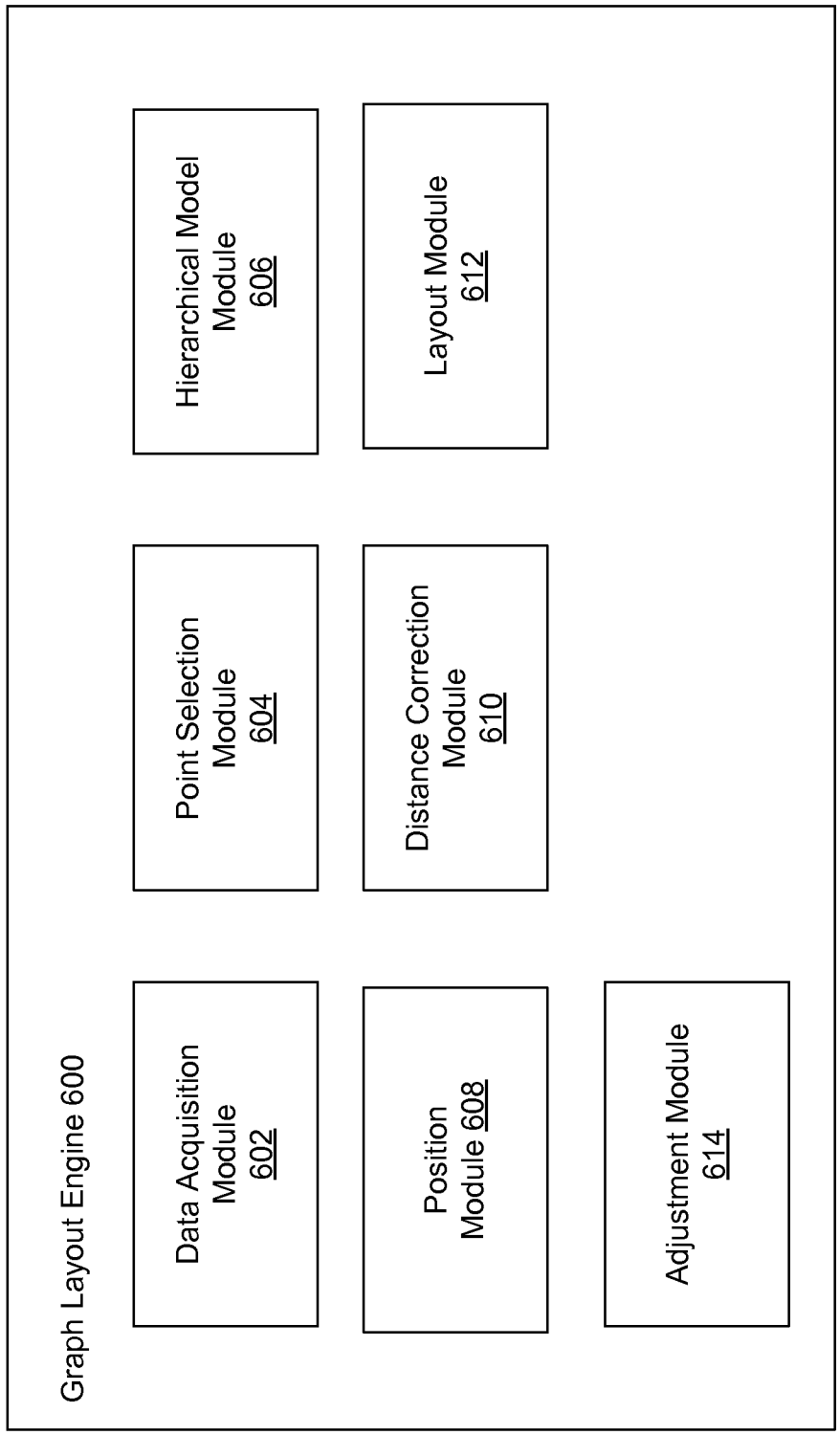
FIG. 6 is a block diagram of a graph layout engine in some embodiments.

FIG. 6 is a block diagram of a graph layout engine 600 in some embodiments. In some embodiments, the graphical layout or display may be performed in two stages. The first stage may comprise the determination and/or display of the initial layout. The second stage may comprise adjusting the initial layout with the goal of reaching a comprehensible and/or stable graph.

In a general example of the first stage of determining the initial layout, data for a graph may be received. Subsequently, a small subset (called the core) of points (e.g., nodes or balls) of the graph may be chosen. The subset may include points that will be displayed at different positions in the initial layout. Once the core points are positioned, subsequent subsets of points from the data are selected and may be positioned based on the core points and/or other points which are members of the selected core points.

Caused in part by the limited number of displayable dimensions, the position and/or distance of one or more points in the graph may not equate with the distances as mathematically derived from the received data. In order to improve the graphical layout, a potential may be determined for one or more points based on the mathematically derived distance and the distance as graphed. The potential may then be minimized to adjust the position of the points.

In one example, a KK potential and gradient-descent (starting with an initial set of positions) may be utilized to lay out the points in the core. Points may be added based on those points already present (e.g., those points that have already been positioned or approximately positioned) and an approximation of the KK solution may be calculated. Once all the points from the data are added, the graph may be updated (e.g., distances and/or position corrected) utilizing gradient-descent on the KK potential.

In some embodiments, the graph layout engine 600 comprises a data acquisition module 602, a point selection module 604, a hierarchical model module 606, an initial layout module 608, a distance correction module 610, a layout module 612, and an adjustment module 614. The graph layout engine 600 may be any software, hardware, or a combination of both. The graph layout engine 600 may be configured to layout and/or draw a graph such as, for example, a force-directed layout graph. The graph layout engine 600 may be resident in a server, a user computer, or any other digital device.

The data acquisition module 602 receives data that may be used to build the graph. The data may be within a table or any other data structure. The data may be in a combination of different data structures. In one example, the data within a table identifies points and edges. The position of the points and/or edges may be identified by vertice as well as by adjacent vertice(s).

Those skilled in the art will appreciate that the vertices and adjacent vertices may represent any kind of data. For example, a massive data set with many dimensions (e.g., thousands of dimensions) may be represented by one or more data structures identifying vertices as well as adjacent vertices.

The point selection module 604 selects points (e.g., balls or nodes) to be positioned in the graph. Those skilled in the art will appreciate that the point selection module 604 may select any number of points based on any number of methods. In various embodiments, the point selection module 604 selects an initial subset of the available points (e.g., the core) from the received data. The selected points may be chosen at random, chosen based on some random information, or be purposefully chosen. In one example, the point selection module 604 selects points that are the farthest distance (e.g., measured by edges) from the previously selected points. For example, the first point may be randomly selected and the second selected point may have the longest distance (e.g., as measured by the maximum number of edges) from the first point when compared to any other two points from the received data. The next selected point may have the longest distance from both the first two selected points when compared to any other point in the received data. Further, the next selected point may have the longest distance from the first three selected points when compared to any other point in the received data. This process may continue until all of the points for the first subset are selected.

There may be any number of initially selected points that make up the first subset from the received data. In one example, 25 points may be initially selected. The 25 selected points may make up the first selected subset. In another example, any number of points equal to or less than 100 points may be selected for the first subset. Each subsequent subset may, in some embodiments, include a greater number of points that the previously selected subset.

In various embodiments, a filtration of depth K (on a set of V points in a graph where |V| is N) is a tower of subsets, V0 being the entire set, V0>V1> . . . >VK, |Vi|/|Vi|/|Vi+1| is about 2, and |VK| is some minimal size.

In some embodiments, the point selection module 604 or position module 608 positions the core points more precisely than points that may be added at a latter time. Subsequent sets of points may then be selected and ultimately added to the graph. In various embodiments, for every subsequently selected subset of points, the point selection module 604 may select twice as many points as the previously selected subset of points. For example, one subset of points may include 110 points and, subsequently, the point selection module 604 may select 220 points in the next subset of points. The graph layout engine 600 may determine a position and/or adjust the position of each point in a subset before the point selection module 604 selects the next subset of points.

The hierarchical model module 606 and position module 608 construct a Faster Approximate Distance Oracle (FADO), an ordering of the points that places the FADO core points first, and a pair of arrays, nearest—an int[N][3] that maps each point k to the three points that appear before it in the filtration which are closest to it, and distance, a double[N][3] that maps each point k to the graph distances of those three nearest neighbors. Those skilled in the art will appreciate that each point k may be mapped to any number of points and may not be limited to being mapped to those points that appear before k in the filtration. Further, each point k may be not limited to being mapped to points that are closest.

The hierarchical model module 606 may construct a table or other structure that comprises distances (exact and/or approximations) between points. The construct or table may be a Faster Approximate Distance Oracle. The FADO may provide a mechanism for getting estimates of the position and/or distance between two or more points in a graph. In one example, the FADO comprises a table or other data structure that, for example, identifies every point. The position or distance of each point relative to one or more of the core points and/or previously positioned points may be determined. The FADO may comprise approximations of the position or distance of some points.

In some embodiments, the core of the FADO may be extracted for every non-trivial component o the graph. The core of the FADO and the component entries may be used to construct a permutation of the points of that component that places the core first. Then, the hierarchical model module 606 or the position module 608 may fill in "nearest previous neighbors" and their graph distances utilizing, for example, a repeated Dijkstra floodout. In some embodiments, this step may actually complete the building of the filtration instance. The reason that the ordering and the FADO may be built together (e.g., simultaneously or near-simultaneously) is that the core of the FADO may correspond to the initial set in the filtration. In some embodiments, the FADO stores only exact distance for log n points.

In various embodiments, the hierarchical model module 606 and/or the position module 608 may determine or correct a position and/or distances for a point and then perform a Dijkstra floodout to determine a predetermined number (e.g., 3) of previously placed points closest to the point to be placed. The hierarchical model module 606 and/or the position module 608 may determine the position of the point to be placed based on the predetermined number closest previously placed points. Those skilled in the art will appreciate that the points may be positioned relative to any number of points including the all or some of the core points, previously positioned points, or points to be positioned. In some embodiments, the graph layout engine 600 stores the determined position or distance in the FADO.

The FADO may initially be described for a finite metric space. A complete distance matrix may be extended to a non-negative weighted graph given by points and edges. For example, let V be the metric space, choose a subset A. For each point x in A, the hierarchical module 604 may compute distances between x and all other points. The approximate distance e(x,y) may be defined to be min a in A of d(x,a)+d(a,y). This may be an upper bound. Those skilled in the art will appreciate that if A is the whole space it is exact, but may not be usable. Further, if A is not too big, the calculation may be cheap. The storage overhead, for example, may be |V|*|A|. In some embodiments, an estimate of error is not determined, however, such estimates may be used. A subset may be chosen by taking max/min landmarks.

The hierarchical model module 606 and/or position module 608 may perform optional fixes to positions and distances in the FADO. For example, the hierarchical model module 606 may construct, for each point x, a ball B(x), of some specified BX_SIZE (say 25) around x containing the nearest BX_SIZE points to x. Then the hierarchical model module 606 may compute the distance between x and y by seeing if x is in B(y) or y is in B(x), and if not, taking the min a in A of d(x,a)+d(a,y). This process may repair errors that come from taking two points quite close to one another and estimating their distance as being quite large. For example, for sampled 5-100 dimensional Euclidean spaces, this may make the average of estimated distance/actual distance to be about 1.05-1.2.

In various embodiments, when there is no distance matrix, but the position module 608 may compute d(x,A) operations in sufficiently short amounts of time that the cost of the construction may still bounded by |V|*|A| for a graph of bounded degree. First, for each a in A the position module 608 may perform a Dijkstra traversal to compute the distances from a to every point in V. As in the case of the metric space, the point selection module 604 and/or the position module 608 may choose A by taking max/min landmarks.

Subsequently, the hierarchical model module 606, position module 608, and/or the distance correction module 610 may place core entries using full SSDE and then adjust using the KK potential force which can be computed on the core (e.g., because distances may be represented).

For each subsequent Vi after VK, i>0, the points may be placed using nearest/distance values and KKFInit. When all of the entries in a given Vi are placed, the hierarchical model module 606, position module 608, and/or the distance correction module 610 may iterate over each point n of the partial graph using the KK potential computed on a randomly selected set of points of kkf_counts[i] also in Vi. kkf_counts[i] decreases fast enough that the cost of all of these operations is O(N*ln(N)) (assuming that the number of edges is O(N)).

For V0 the initial placement may go as before, but, in some embodiments, the iteration step may compute the KK potential on just the adjacent points (e.g., the last step only does a local refinement). There may be any number of iterations. In one example, the number of iterations is ten.

In various embodiments, the distance correction module 610 adjusts the graphical distance of the points. In one example, the distance correction module 610 attempts to equate graphical distance (e.g., the distance as may be displayed in the graph) with topologic distance (e.g., the distances as determined mathematically based on the receive data). If these distances are equal, the distance correction module 610 may not perform any additional function. However, if these distances are not equal, the distance correction module 610 may attempt to display the graph distance at a point that approximates that topologic distance. In some embodiments, distances may equate with position.

In various embodiments, topologic distance is the distance within the mathematically defined space between two or more points. Those skilled in the art will appreciate that the topologic distance may have any number of dimensions. When the graph data received by the data acquisition module 602 is projected as a viewable graphic, the projection may limit the depiction of one or more dimensions used to display the points. As a result, the graphical distance (e.g., Euclidean distance) between two points as displayed in the graph may not equate the topologic distance between the two points as defined in the mathematical space.

In order to improve the layout of the graph, the graphical distance may be equated to the topologic distance and/or an approximation may be determined to allow the graphical distance to approximate the topologic distance. In various embodiments, the graphical distance between two or more points may be displayed in a manner that enables the user to perceive the graphical distance as approximating or representing the topologic distance.

In some embodiments, a potential may be calculated between two or more points. The potential may provide a gradient that may be decreased and/or minimized to improve a graphical distance approximation. In one example, the distance correction module 610 may determine the potential using the KK potential. The distance correction module 610 may subsequently apply a gradient descent upon the potential to determine the graphical approximation to the topologic distance.

In an example of utilizing the KK potential, a potential function a graph may compare the relative distances, denoted |X−Y|, of the point positions in Euclidean (e.g., displayed graph) space, where the position of point i is denoted by loc(i), to their interpoint distances in the intrinsic graph metric, Denoted DG(i,j). In some embodiments, if we define err(i,j) as err(i,j)=(|loc(i)−loc(j)|−DG(i,j)) we may then define the stress of the graph to be:

stress($G$)=SUM($i<j$ in $G$){($W(i,j)$*SQUARE(err($i,j$)))} for some positive, symmetric weight function W(i,j).

The weight function may be DG(i,j) to some negative power such as 1/(DG( )*DG( )). in that case:

stress($G$)=SUM($i<j$ in $G$){SQUARE((|loc($i$)−loc($j$)|/ DG($i,j$))−1.0)}

We may define a real-valued function from R2, say, by defining the stress of the graph with point i at X to be stress($G,X$)=SUM($j!=i$)in $G${SQUARE((|X−loc($j$)|/ DG($i,j$))−1.0)}

In this case, the negative gradient may be:

−2.0*SUM($j!=i$){(((|X−loc($j$)|/DG($i,j$))−1)([X−loc($j$)]/ (DG($i,j$)|X−loc($j$)|))} or

−2.0*SUM($j!=i$){1/DG($i,j$)*(1/DG($i,j$)−1/|X−loc($j$)|)* [X−loc($j$)]}

We may use this gradient, normalized, to graph and/or display a force-directed layout.

For example, for a KK solution for a 4 point (e.g., 4-point) problem, if there is a point that wasn't placed, the distance correction module 610 may attempt to place the point by finding the three closest points that were already in place (e.g. points whose positions have been determined), and then the distance correction module 610 may place the point at the spot that minimizes the KK potential for those 4 points.

In various embodiments, in order to determine the placement of a new point, three points are selected (e.g., wherein the three points have already been placed within the graph) and the new point may be placed in the spot that minimizes the potential for each pair of the three points. The minimum may be either 1 or 2 points. In some embodiments, the three points that are closest together may be selected and the barycenter (a+b+c/3) of those three points may be determined. The new point may be placed at or near the barycenter.

For example, for hierarchical layouts, the distance correction module 610 may take K points already placed, and then the distance correction module 610 may place X so as to minimize the potential for that point. The distance correction module 610 may take K to be all the points, but that may make the problem at least N-squared.

Those skilled in the art will appreciate that two points may be relatively simple to solve, however, if P1 is at (0,0) and P2 is at (1,0), then regardless of X=(x,y), the point (x,−y) also may have the same potential (for those 3 points). As a result, the distance correction module 610 may take three points. Further, those skilled in the art will appreciate that although the KK potential may be determined for three general points and a fourth may be added, the result may be close to the barycenter of the three closest 3-point solutions.

After the potential is determined, the distance correction module 610 may perform a "relaxation" step wherein the distance correction module 610 minimizes or approximates the minimum of the potential function for the graph as currently constructed (e.g., for those points which have been graphically displayed and/or positions have been determined). The "relaxation" step may be performed as one or more of the placements of points are determined. Those skilled in the art will appreciate that as this process is completed at the initial stages, the results will improve at the time the graph layout is completed since it is possible that not all the points in the end of the process may be accounted (e.g., to take into account all points at the end of the process may be computationally too expensive).

In various embodiments, the gradient of the potential for each point (pretending that all the other points are fixed) is approximated. In one example, a predetermined number of points may be chosen. The points may be chosen at random or order may be included in the process of choosing points. For example, several points that are a maximum number of edge lengths away from each other and/or the other selected points may be chosen. The gradient may then be computed. In some embodiments, for the last "relaxation" step, the points that are connected to X may be taken to make a gradient. Those skilled in the art will appreciate that there are many ways to approximate the gradient of the potential.

Many methods may be used to adjust the position or distance of the points. For example, the distance correction module 610 may perform a gradient descent with a max step-size and remembering the last step because the potential may have oscillations which may be damped. The gradient descent may also be computationally reasonably quick. Those skilled in the art will appreciate that that the points may be moved in any number of ways, including, but not limited to, the Runge-Kutta method for getting a higher-order approximate solution.

Once the initial position and/or distance for each point is determined, the layout module 612 may display the points within the graph. In some embodiments, the layout module 612 displays any number of points before the initial position and/or distance of all points are determined. In various embodiments, the layout module 612 may not display the graph until one or more points of the graph are adjusted by the adjustment module 614.

In various embodiments, once the position and/or distances are determined for each point, the position of one or more points is adjusted by the adjustment module 614. The adjustment module 614 may move or adjust points to ensure that all forces acting upon each point cancel and there is no net effect. If all forces upon a point cancel, then the points may no longer be moved.

In some embodiments, the adjustment module 614 determines forces upon a point. The forces may include the force provided by the edges coupled to the point as well as forces that are provided via a subset of points in the graph. The subset need not be coupled to the subject to produce a force. For example, for a subject point, the adjustment module 614 identifies a subset of points of the graph that may enact a force on the subject point and identifies the forces on the subject point provided by the edges.

The adjustment module 614 may provide the position module 610 a new position for the subject point that may allow the forces on the subject point to cancel or otherwise trend towards a zero net effect. In some embodiments, the adjustment module 614 may adjust or direct the position module 610 to adjust the position of a point until the forces that are enacted on that point become zero force or are within a predetermined threshold (e.g., within a proximity of zero force). The adjustment module 614 may spread one or more points apart by enforcing the spring or energy of connecting edges as well as the forces provided by the identified subset.

The adjustment module 614 may select a different subset of points for one or more different points. For example, each point may be influenced by a different subset of points. If a member of a subset provides a force on a subject node, the subject node may also provide a force on the member of the subset in return. As a result, all forces throughout the graph may cancel depending on the positions of the points.

In one example, the edges (e.g., springs) have a desired length, which may be constant (e.g., 1.0 for all edges in the graph). The edges may also repel (e.g., through a function similar to Hooke's law) when connected points are too close and attract when the connected points are too far apart. When a component has too many points (e.g., a component's points are greater than 100), instead of using N*N calculation, the adjustment module 614 may construct balanced samples of the component of a predetermined size (e.g., 20). When the adjustment module 614 uses samples, the adjustment module 614 may compute the gravitational force on a point x by computing the usual "gravitational" force exerted by each point in sample[x] on x, and then multiplying that force by $(N-1)/(\# \text{ in sample}[x])$. The size of sample[x] may be the same for all x, when the adjustment module 614 samples, but it is possible for sample[x] to have repeated values (but x may not be in sample[x]).

In various embodiments, the adjustment module 614 constructs a set of size 'balanced samples' of [0,modulus-1]. The return value, samples[ ][ ], may be an int[modulus][size], where samples[i] is a 'random' subset of [0,modulus-1]. The samples may be balanced in that if A appears in samples[B] n times, then B appears in samples[A] the same number of times, and X in [0,modulus-1] appears precisely size times in all of the samples.

In some embodiments, being balanced means that the net force on a component may be 0, and it spreads the pairs around the component. If the component is of size N, and the samples are of size K, then recall the adjustment module 614 may multiply the force by (N-1)/K to adjust for looking at fewer points (in other words, it really is the ratio of the number of points looked at vs. how many that would have been looked at in the non-sampling case).

Those skilled in the art will appreciate that one way to make these balanced samples is to take the "columns" to be given by permutations of the set that do not have fixed points (e.g., no point can push on itself), and make sure that the permutation and its inverse are both included (so we throw out an self-inverses). Permutations may be avoided that have short cycles (if there is a small subset that the permutation keeps fixed, then everything in that set may be ignoring the rest of the component).

In some embodiments, the particular permutations used by the adjustment module 614 may map the elements from [0, N) by $x \rightarrow (A*x+B) \% N$, where B is non-zero and A is relatively prime to N. They may be simple, and may seem to have relatively long periods. Those skilled in the art will appreciate that the adjustment module 614 may choose permutations at random, or construct them in other ways. In various embodiments, it is not necessary to use permutations.

It will be appreciated that a "module" may comprise software, hardware, firmware, and/or circuitry. In one example, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

In some embodiments, the graph layout engine 600 stores only n log n positions and/or computations in storage as opposed to n*n positions or computations as required by the prior art. As a result, in some embodiments, techniques discussed herein may be more computationally efficient than those in the prior art.

Figure 7:
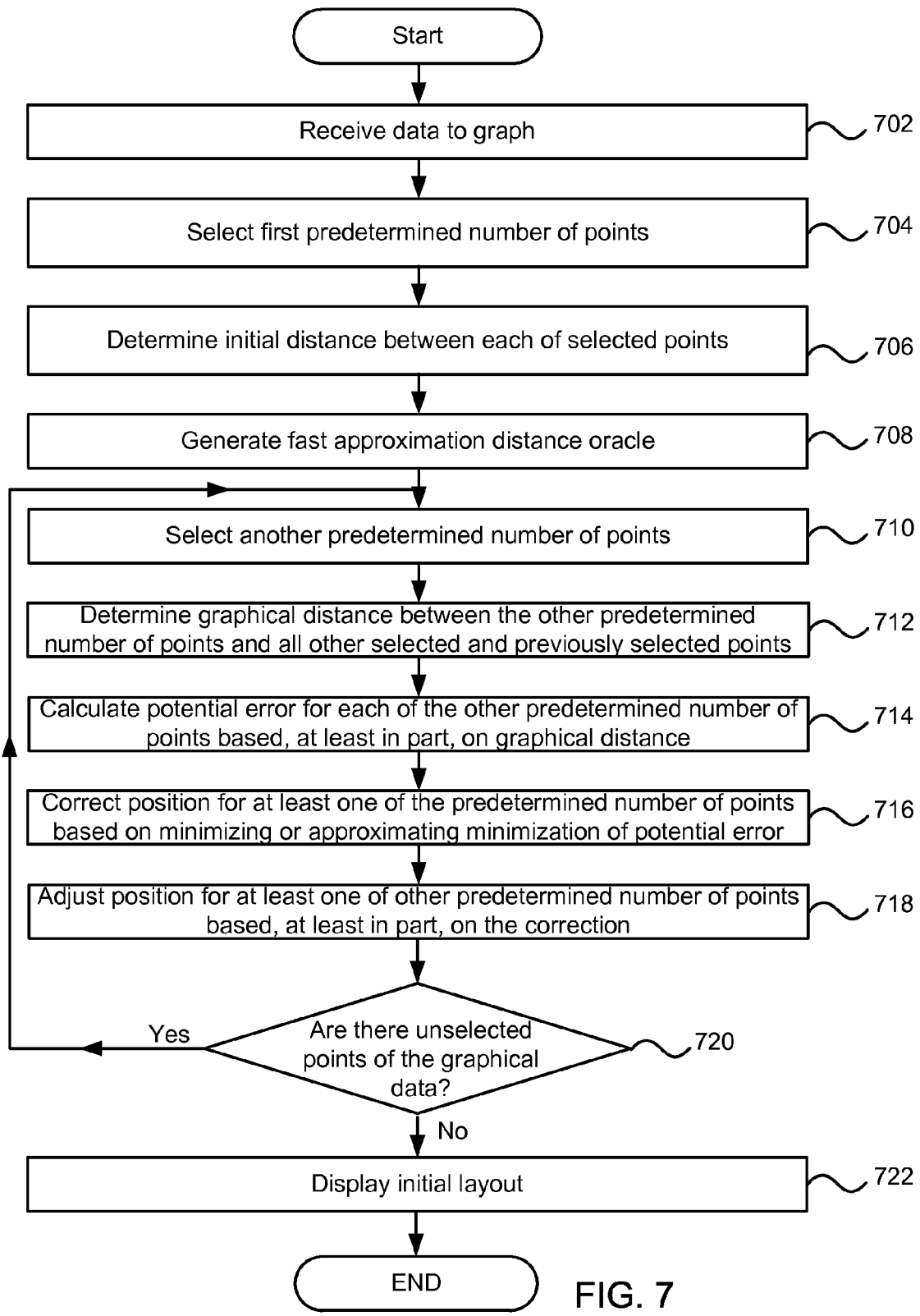
FIG. 7 is a flow chart of a method for an initial graph layout in some embodiments.

FIG. 7 is a flow chart of a method for an initial graph layout in some embodiments. In step 702, the data acquisition module 602 receives data to graph. In some embodiments, the data may be a table or other data structure comprising information associated with points and edges. In one example, the data structure comprises a list of vertices and adjacent vertices. In various embodiments, the data acquisition module 602 may be configured to convert data in any format or combination of formats into a table or other data structure of points and edges.

In step 704, the point selection module 604 may select a first predetermined number of points (called the core). In some embodiments, the core points may be spaced throughout the general graph. The points may be randomly selected. In some embodiments, subsequently selected points may also be random or selected based, in part, on distance from previously selected points. As a result, the placement of subsequent points may also be spaced across the graph. Those skilled in the art will appreciate that each subsequent set of points may be built around the core and the previously positioned points.

In step 706, the position module 608 may determine an initial distance between each of the first predetermined number of points. The position and/or distance of each of the first predetermined number of points may be determined based on the received data. In some embodiments, the selection of points for the first predetermined number of points may occur simultaneously or near simultaneously. For example, although the first point of the core may be chosen at random, a second point may be selected that is the farthest distance (e.g., as measured by number of edges) from the first selected point. As a result, the position of the second core point may be determined as a part of the process of point selection. The next selected point may be the farthest distance from the first and second selected points. The process may continue in a like fashion until the core points are selected. The next predetermined number of points may be positioned based, in part, on the position of the core points. The third predetermined number of points may each be positioned based, in part, on the positions of the core points as well as the positions of the second predetermined number of points. This process may continue until all of the points are selected. In some embodiments, all points are randomly selected.

In some embodiments, the core points may be selected and/or positioned using an eigenvector approach where the first two eigenvalues are correlated to the x and y axis, respectively. The eigenvector may position the core points in a computationally efficient manner. Once the core points are selected, subsequent points may be selected and/or positioned based on the FADO as described herein. Although eigenvector approaches can be efficient for limited uses, these approaches may not effectively scale and, further, eigenvector approaches may cause significant changes in a depicted graph if the graph is altered (e.g., changed by a user selecting and dragging one or more points for an improved layout).

In step 708, the hierarchical model module 606 may construct the fast approximate distance oracle (FADO). The FADO may be a reference table or other data structure that comprises point identifiers and at least some positions and/or distances between points. The positions of points and/or distances between points of the core of the FADO may be determined. Positions and/or distances determined and stored in the FADO may be approximations thereby potentially increasing computational efficiency.

Those skilled in the art will appreciate that the FADO may assist in the initial layout of the graph. The FADO may contain point identifiers as well as information associated with the points that allow for the determination or calculation of positions of one or more points and/or distances between one or more points.

In some embodiments, the FADO is optional. For example, distances and positions may be determined based on subsequently placed points as discussed herein without referring to a data structure that previously stored the information.

In step 710, the point selection module 608 may select another subset of points. Each subsequent subset of points may be larger than the previous subset. In some embodiments, every subset of points selected after the initial subset may contain points that were randomly selected. In some embodiments, the points may be selected in a manner similar to the selection of points of the first subset (e.g., based on position and/or distance from previously selected points).

In step 712, the distance correction module 610 determines graphical distance between the other predetermined number of points and all other selected and previously selected points. The position of the newly selected points may be based, at least in part, on information contained with the FADO. For example, the point selection module 604, hierarchical model module 606, and/or the position module 608 may retrieve or compute graphical distances between each of the points of the newly selected subset as well as graphical distances between each of the newly selected points and the previously selected points. One or more of the graphical distances may be approximated and/or based on previous approximations.

In step 714, distance correction module 610 may calculate a potential error for reach of the other predetermined number of points based, at least in part, on the graphical distance. In one example, the point selection module 604, hierarchical model module 606, and/or the position module 608 determines a topologic distance between two or more points. The topologic distance may, in some embodiments, be stored in the FADO. The distance correction module 610 may compare the graphical distance to the topologic distance to determine and/or calculate a potential error. If there is no error or the error is within a predetermined error margin, no potential error is calculated in the process may go to step 720. In some embodiments, the potential error may be represented as a potential (e.g., kk potential).

If the graphical distance and the topologic distance between two or more points are not equal, the distance correction module 610 may determine a correct position for a point based on minimizing or approximating minimization of the potential error. In one example, the distance correction module 610 minimizes or approximates the minimization of the potential (e.g., kk potential).

In step 718, the position module 608 and/or the layout module 612 may adjust the position of at least one point based, at least in part, on the correction. In various embodiments, the adjustment to the position and/or distance is stored in the FADO. In some embodiments, the adjusted position of the point is displayed and/or stored in any data structure.

In step 720, the point selection module 604 determines if there are any unselected points from the graph data. If not, all points have been selected and their positions or distances determined, the method may continue in step 710 where the point selection module 604 may select another subset of points.

In step 722, the layout module 612 displays the initial layout. In various embodiments, the layout module 612 displays all points and edges simultaneously or near simultaneously. In one example, the layout module 612 depicts the initial layout when all positions with potential error have been adjusted. In some embodiments, the layout module 612 depicts each point of the graph if there is no potential error or upon correction of the potential error. Those skilled in the art will appreciate that, however, that any number of points may be displayed at any time. For example, the layout module 612 may display any number of points after positions and/or distances of a predetermined number of points has been determined and/or corrected. In some embodiments, the layout module 612 displays each point as soon as the initial position is determined. Subsequently, the layout module 612 may visually adjust the position of the point as necessary.

Figure 8:
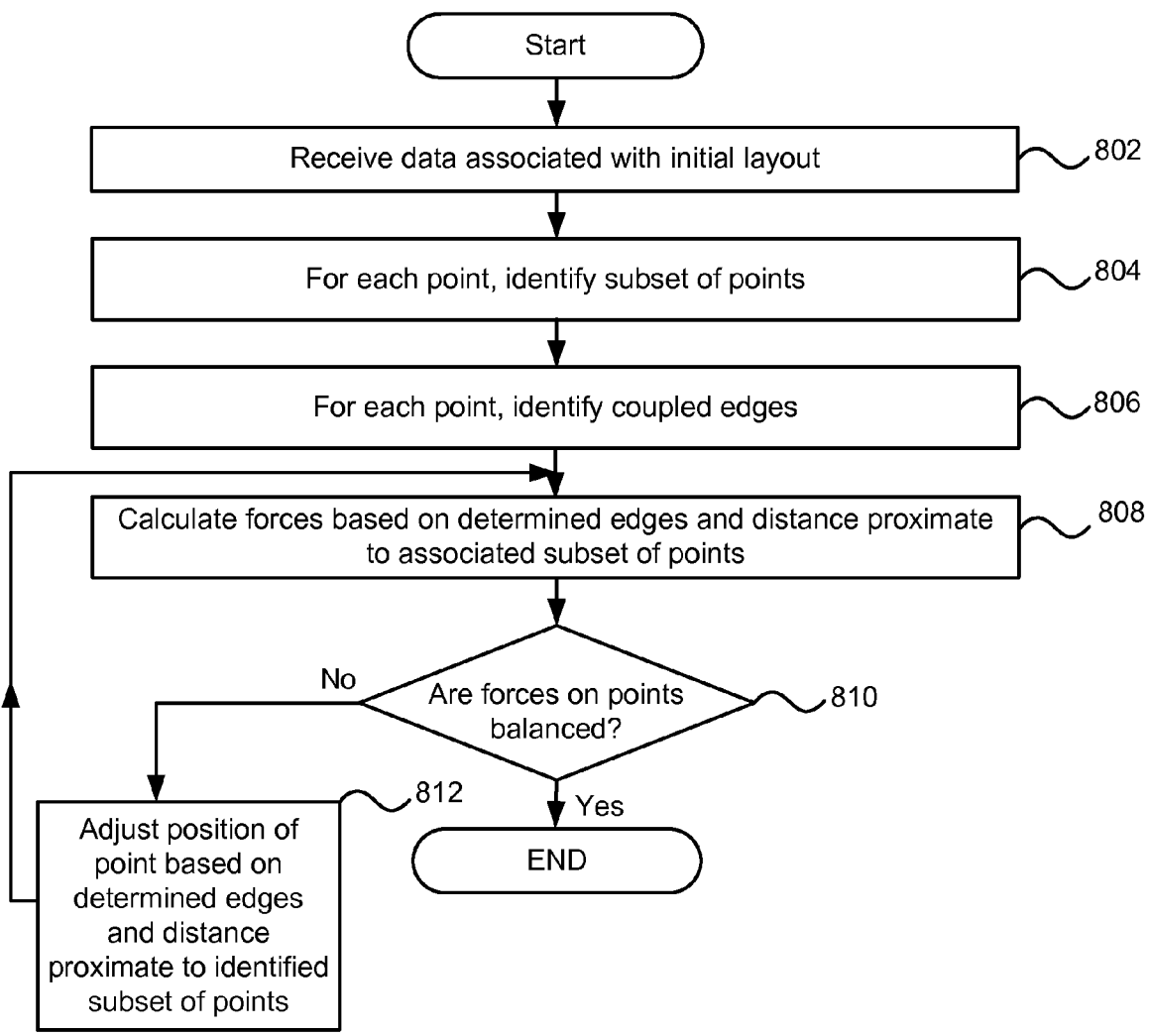
FIG. 8 is a flow chart of a method for adjusting the graph layout in some embodiments.

FIG. 8 is a flow chart of a method for adjusting the graph layout in some embodiments. In step 802, the graph layout engine 600 receives data associated with the initial layout. In some embodiments, this step is optional. For example, the graph layout engine 600 may have generated the initial layout, and, as a result, does not to retrieve or otherwise receive the data associated with the initial layout. In some embodiments, the graph layout engine 600 may generate and provide the initial layout to one or more digital devices, processors, storage devices, and/or buffers. Those skilled in the art will appreciate that the graph layout engine 600 may retrieve the initial graph layout from one or more sources. In some various, there are multiple graph layout engines including a first engine that prepares the initial graph layout while the second engine performs the adjustments.

In step 804, the point selection module 604 and/or the adjustment module 614 may identify a subset of points for each point of the initial layout. Each point of the initial layout may be associated with a different subset of points. The points of the subsets may be termed "antigravity" points. In some embodiments, one or more points may be positioned, at least in part, relative to one or more of the antigravity points as if there was an edge applying a force. For example, a point may be coupled to three other points by three edges. The graph may have four antigravity points. The point may be subject to the forces of the three edges as well as forces that would be derived if the point was coupled to the antigravity points by additional edges. The points of the subset(s) may be located at different positions throughout the graph (e.g., in a manner similar to the core points that are initially selected during the initial layout).

There may be any number of antigravity points associated with at least one other point. For example, there may be 100 antigravity points applying force to one other point. In some embodiments, a first point may act as an antigravity point to 100 points which, in turn, act to provide force as antigravity points to the first point.

In various embodiments, one or more points of the initial layout may be influenced by different subsets of antigravity points. The applied forces may be symmetrical. For example, if two points are coupled by an edge, both points will be affected by the force of the edge. Similarly if a first point acts as an antigravity point to a second point, the second point may act as an antigravity point to the first point.

In step 806, the adjustment module 614 identifies edges and forces, if any, for each point of the initial layout. In step 808, the adjustment module 614 calculates the forces on each point based on the identified edges and the associated subset of antigravity points. In various embodiments, the adjustment module 614 may enforce forces associated with actual edges and/or points that are proximate (e.g., without a predetermined distance threshold). For example, the adjustment module 614 may determine the forces acting upon a point as including actual edges of the point as well as the forces between proximate one or more antigravity points (e.g., one or a subset of all of the antigravity points).

In step 810, the adjustment module 614 may determine if all of the forces on all of the points are balanced. If they are not balanced, then, in step 812, the adjustment module 614 may adjust the position of one or more points based on predetermined edges and distance proximate to the identified subset of points (e.g., the core). In some embodiments, the layout module 612 depicts the adjustment during or after the position is adjusted. The process continues in step 808 where the adjustment module 614 may recalculate, based in part on the new positions of one or more points, the forces based on the determined edges and distance proximate to the associated subset of points. Alternately, if the forces on all points are balanced, the method may end.

Those skilled in the art will appreciate that, in some embodiments, all points are assessed and changes made to the position or distance of points simultaneously or near simultaneous. In some embodiments, one point or a subset of points are selected. For each selected point, the adjustment module 614 may identify points and edges, calculate the forces based on the edges as well as the assumed edges to the antigravity points, and make the changes. Subsequently, another subset of previously unselected points may be similarly assessed and adjusted, and so on.

Figure 9:
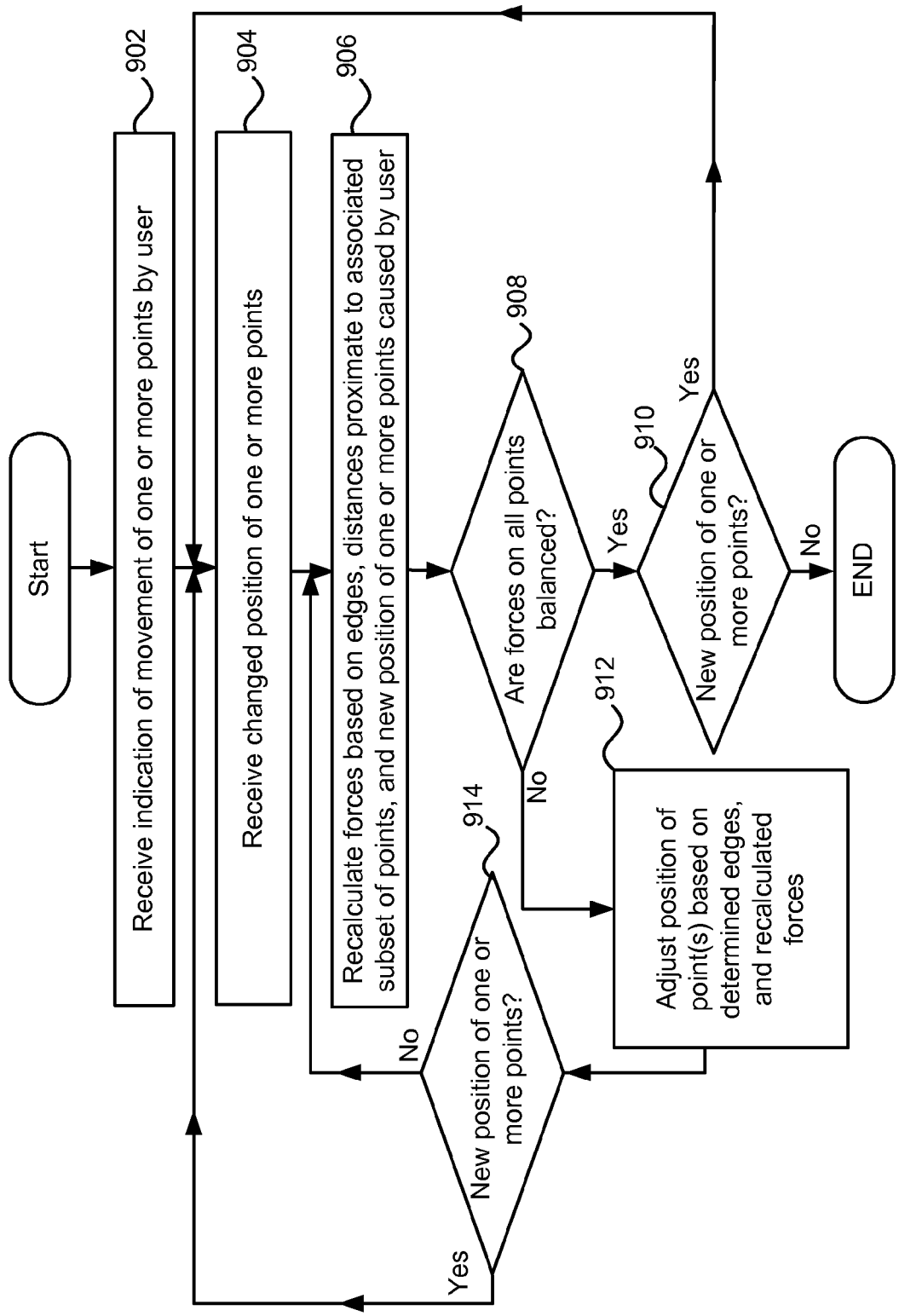
FIG. 9 is a flow chart of a method for adjusting a graph layout in response to a user moving one or more points in some embodiments.

FIG. 9 is a flow chart of a method for adjusting a graph layout in response to a user moving one or more points in some embodiments. In step 902, the graph layout engine 600 may receive an indication of movement of one or more points of a graph by a user. In some embodiments, the layout module 612 may react to a user clicking and dragging one or more points by allowing the selected point(s) and related points (e.g., those coupled to the moving points by an edge). In some embodiments, a digital device, as discussed herein, indicates movement of one or more components of the graph has taken or is taking place.

In some embodiments, the graph layout engine 600 may initially display movement of the user's selection (e.g., the selected points and edges as well as those edges and points coupled to the user's selection) without adjusting the position of the points and edges of the rest of the graph. In one example, the graph layout engine 600 is responsive to any selection or movement of the user. Once cycles and/or resources are available, the graph layout engine 600 may recalculate forces for one or more points that may be effected by the user's action. As a result, the forces of all points that may be associated with the user's action (e.g., a point or edge that is coupled, however indirectly, with the user's selection) may be recalculated to determine a new position. Points and edges that have no relation to the user's selection (e.g., a separate collection of points and edges that are not coupled in any way to the user's selection) may not be recalculated. Those skilled in the art will appreciate that, in some embodiments, the forces on one point, a subset of points, or all points may be recalculated and movements determined at any time.

In step 904, the point selection module 604 and/or the adjustment module 614 may receive or determine a change of position of one or more points. In one example, the adjustment module 614 may receive from an operating system or other application information related to what the user selected and any movement of the selected portion of the graph. This information may, in some embodiments, be received from a rendering engine configured to display the graph, receive user interactions, and respond to user interactions.

In step 906, the adjustment module 614 recalculates forces for one or more points based on edges, distances proximate to associated subset of points, and new position of one or more points caused by the user. As discussed herein, each point of the initial layout may be associated with a different subset of antigravity points. The antigravity points may continue to provide forces on the associated points. As a result, in order to determine the forces on a point, the point's edges are taken into account as well as the forces from the subset of antigravity points (e.g., in a manner similar to the process discussed regarding adjusting the initial layout over time).

In step 908, the adjustment module 614 may determine if all of the forces on all of the points are balanced. If the forces on all points are balanced, the graph layout module 600 determines if there are new positions of one or more points caused by the user in step 910. If they are not balanced, then, in step 912, the adjustment module 614 may adjust the position of one or more points based on the recalculated forces.

In various embodiments, the adjustment module 614 may adjust the position of any number of points and edges during the user's interaction. For example, as the user drags a selection of points and edges, the adjustment module 614 may recalculate forces and move a number of points and edges associated with the user's selection and action. As the user continues to act (e.g., by continuing to move the previously selected points and edges or the user moving another subset of points and edges), the adjustment module 614 may continue to recalculate forces and adjust positions. These processes may occur in parallel.

If, in step 910, the graph layout module 600 determines that there are new positions from the user, the process may return to step 904 and the new positions are received.

In step 914, the graph layout module 600 determines if there are new positions of one or more points caused by the user. If the graph layout module 600 determines that there are new positions from the user, the process may return to step 904 and the new positions are received. If there are no other new positions from the user at that time, the adjustment module 614 may recalculate forces based on edges, distances proximate to associated subset of points, and the new (e.g., last) position of one or more points caused by the user in step 906.

In some embodiments, the layout module 612 depicts the adjustment during or after the position is adjusted.

Those skilled in the art will appreciate that, in some embodiments, all points are assessed and changes made to the position or distance of points simultaneously or near simultaneous. In some embodiments, one point or a subset of points are selected. For each selected point, the adjustment module 614 may identify points and edges, calculate the forces based on the edges as well as the assumed edges to the antigravity points, and make the changes. Subsequently, another subset of previously unselected points may be similarly assessed and adjusted, and so on.

Figure 10A:
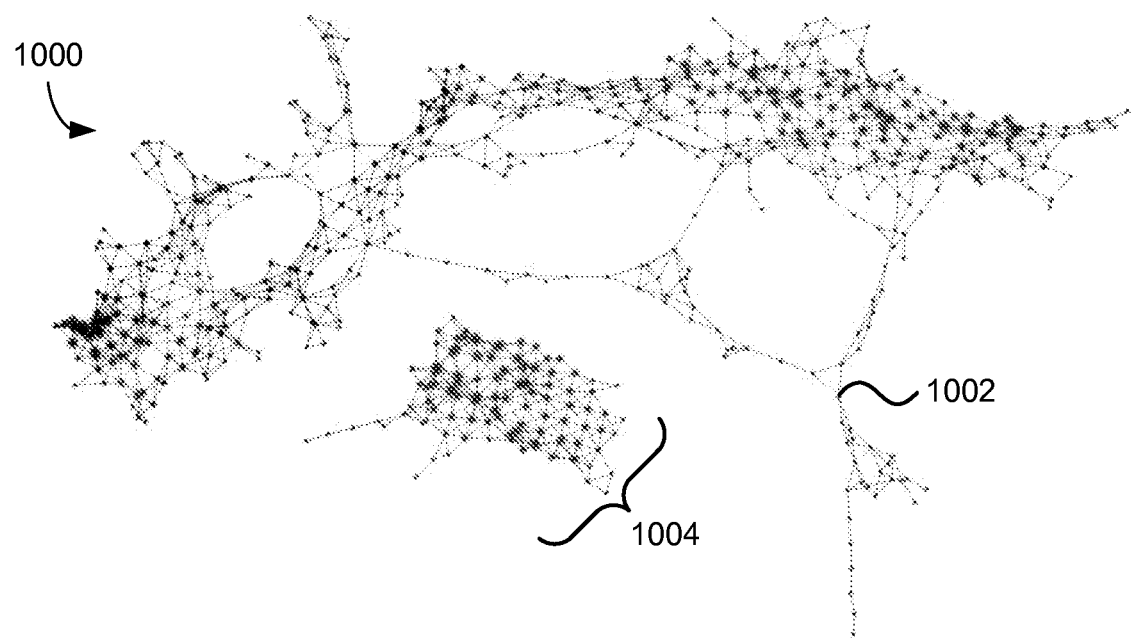
FIG. 10a is a graph layout in some embodiments.

FIG. 10a is a graph layout 1000 in some embodiments. Graph layout 1000 may depict a stable graph layout. For example, the graph layout 1000 may depict a graph after the initial layout and the adjustment of the initial layout.

Graph layout 1000 depicts a large number of points of complex data. In some embodiments, points that are connected (e.g., coupled together by an edge) share at least some data. For example, each point may represent a plurality or combination of independent variables (e.g., patient identifiers) that share one or more dependent variables (e.g., characteristics). For example, point 1002 may represent a number of patients that share a particular gene expression or test result. Alternately, one point may represent a plurality or combination of dependent variables that share one or more independent variables. The size of the point may indicate the number of independent variables (e.g., a larger point suggests that there are a large number of people who share that gene expression or test result while a smaller point suggests that there are a smaller number of people who share the gene expression or test result).

An edge between points may suggest that the connected points share independent or dependent variables. In one example, two connected points may share one or more of the same patients. A patient with both gene expression A and gene expression B may be identified in both points; as such, the points may be connected. In some embodiments, the size or color of the edge may suggest the number of shared relationships between the points.

Group 1004 is separated from the rest of the points. In some embodiments, the points in group 1004 may not share any independent and/or dependent variables with the rest of the points. Since group 1004 is not coupled to the rest of the points, group 1004 may not move when a point of the larger grouped is pulled.

In various embodiments, the group 1004 may move when the larger group is moved because of the movement of one or more antigravity points. As discussed herein, the adjustment module 614 may select one or more points throughout the graph "antigravity" points. All other points in the graph may act as though an edge couples each non-antigravity points with one or more antigravity points. As such, when the antigravity points move (e.g., by a user moving one or more points), even an otherwise uncoupled point may move as well. Alternately, since the points and edges of group 1004 are not coupled to the larger group, a movement of the larger group may not effect the forces and/or placement of group 1004.

Figure 10B:
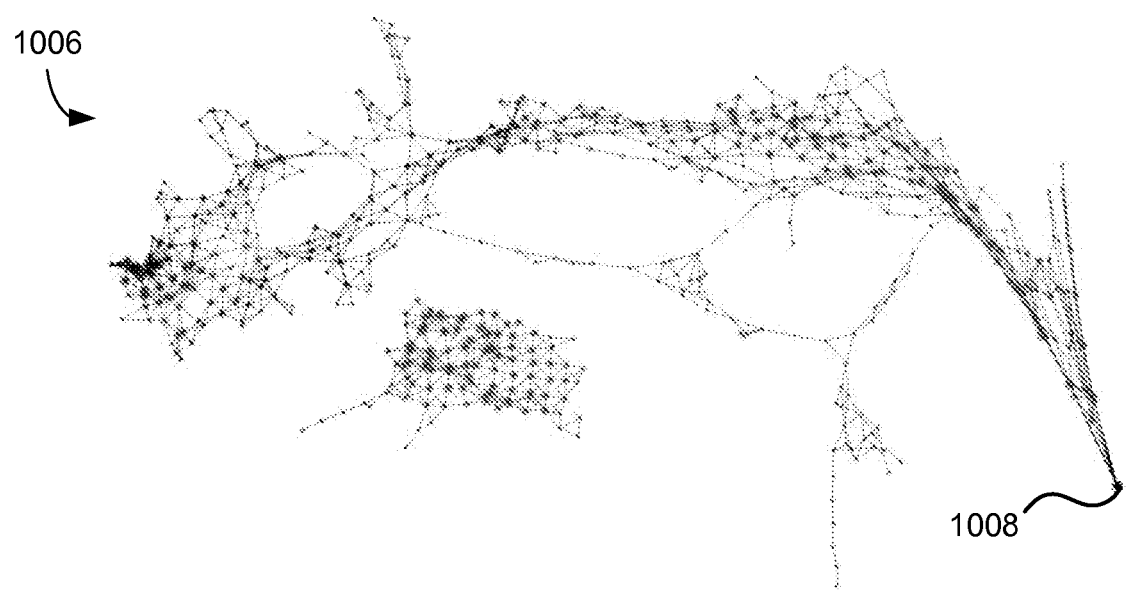
FIG. 10b is the graph layout wherein a node of the graph is pulled by a user in some embodiments.

FIG. 10b is the graph layout 1006 wherein a point 1008 of the graph is pulled by a user in some embodiments. The user may select any number of points, any number of edges, or a combination of points and edges. The user may move the selected objects (e.g., the points and/or edges). In one example, the user utilizes an I/O device such as a mouse to select and move the points and/or edges. In FIG. 10b, the user may move only a single point 1008. As the user drags the point, all points and edges that are directly coupled to the moved point 1008 may also move (e.g., are dragged).

In some embodiments, the rest of the graph that may not be directed effected otherwise as a result of the movement may not adjust to the movement (if at all) until after the user has completed the movement. Alternately, one or more points in the graph may move as the user moves point 1008 (e.g., the points and/or edges of the graph may be moved and/or adjusted as the user moves point 1008.

In FIG. 10b, it may be noticed that the graph layout 1006 may undergo small changes as a result of the user's movement of point 1008. For example, "holes" as depicted in the data may squeeze shut or otherwise disappear as the graph is moving. Although the left side of the graph may have few changes between FIGS. 10a and 10b, changes may be more pronounced depending on proximity to the user's movement.

Figure 10C:
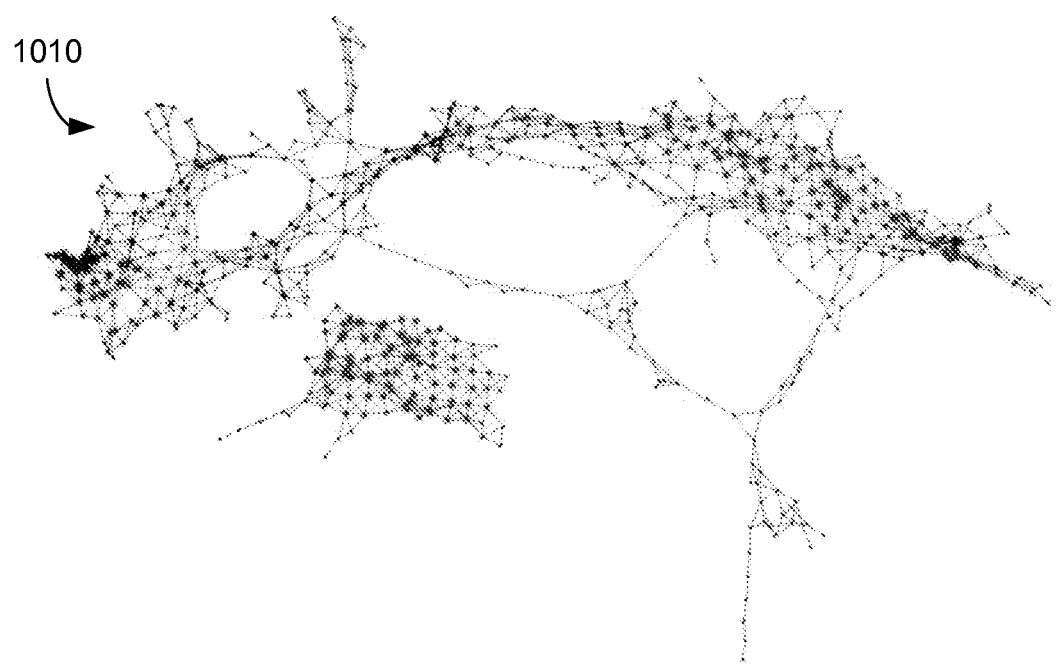
FIG. 10c is the graph layout after adjusting to the new position over time in some embodiments.

FIG. 10c if the graph layout 1010 after adjusting to the new position over time in some embodiments. The right side of the graph layout 1010 may be significantly altered as a result of the user's movement of the point 1008. In one example, the user moves the point down and to the right of the graph before the user pulls the point 1008 back upwards. Points immediately or proximately coupled with the point 1008 may also have pronounced movement. Points which are farther away or unconnected may not be affected.

In some embodiments, user movements of points and/or edges are not altered. Rather, the user may place the points and/or edges in a specific location. Rather than reorganizing or repositioning the points and/or edges moved by the user, the adjustment module 614 may adjust the points and balls around the new position.

Figure 11:
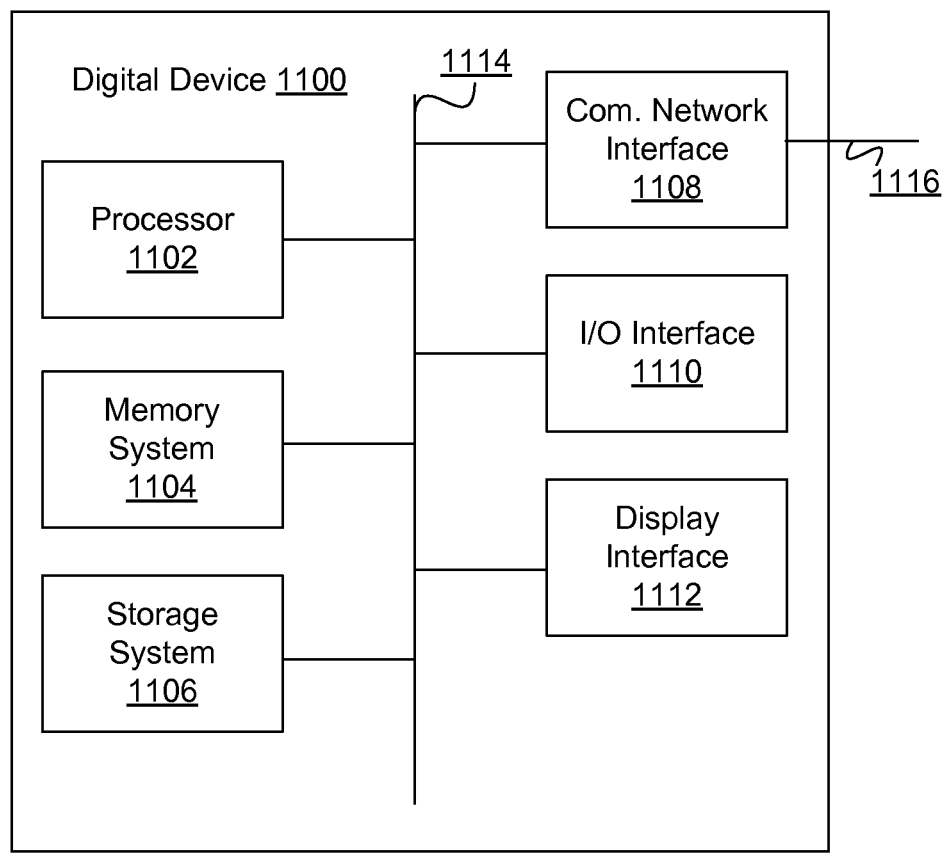
FIG. 11 is a block diagram of an exemplary digital device.
Figure 12A:
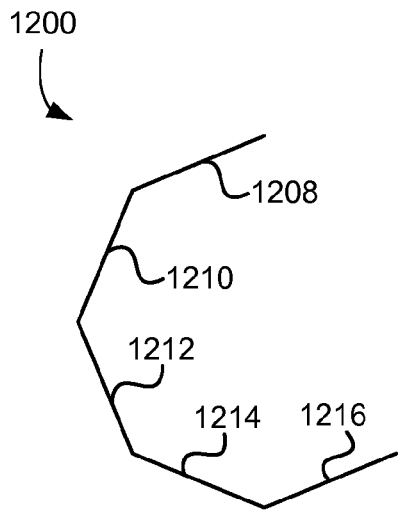
FIG. 12a depicts a graph wherein edges are individually drawn in the prior art.
Figure 12B:
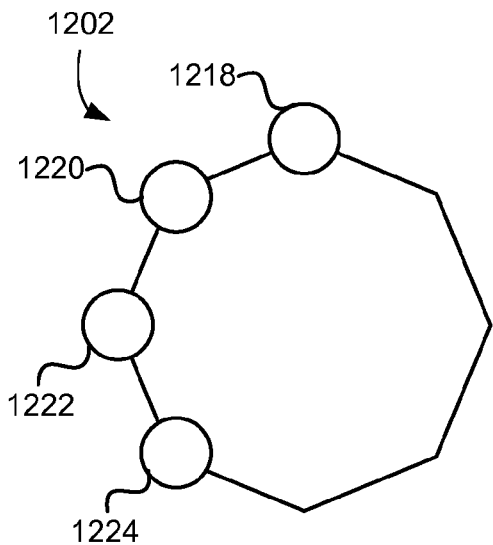
FIG. 12b depicts a graph wherein edges have been completed and nodes are individually drawn in the prior art.
Figure 12C:
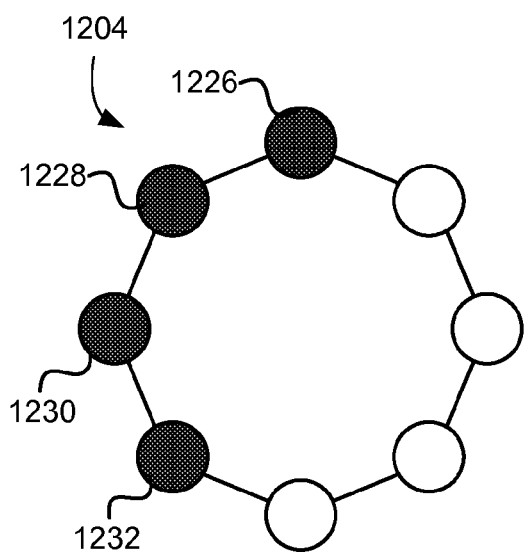
FIG. 12c depicts a graph wherein edges and nodes have been completed and nodes are individually colored in the prior art.
Figure 12D:
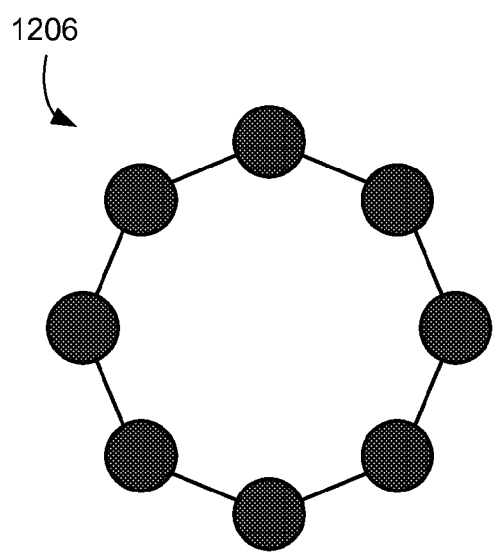
FIG. 12d depicts a finished graph after separate commands have been generated for each component of the graph in the prior art.

FIG. 11 is a block diagram of an exemplary digital device 1100. The digital device 1100 comprises a processor 1102, a memory system 1104, a storage system 1106, a communication network interface 1108, an I/O interface 1110, and a display interface 1112 communicatively coupled to a bus 1114. The processor 1102 is configured to execute executable instructions (e.g., programs). In some embodiments, the processor 1102 comprises circuitry or any processor capable of processing the executable instructions.

The memory system 1104 is any memory configured to store data. Some examples of the memory system 1104 are storage devices, such as RAM or ROM. The memory system 1104 can comprise the ram cache. In various embodiments, data is stored within the memory system 1104. The data within the memory system 1104 may be cleared or ultimately transferred to the storage system 1106.

The storage system 1106 is any storage configured to retrieve and store data. Some examples of the storage system 1106 are flash drives, hard drives, optical drives, and/or magnetic tape. In some embodiments, the digital device 1100 includes a memory system 1104 in the form of RAM and a storage system 1106 in the form of flash data. Both the memory system 1104 and the storage system 1106 comprise computer readable media which may store instructions or programs that are executable by a computer processor including the processor 1102.

The communication network interface (com. network interface) 1108 can be coupled to a network (e.g., communication network 114) via the link 1116. The communication network interface 1108 may support communication over an Ethernet connection, a serial connection, a parallel connection, or an ATA connection, for example. The communication network interface 1108 may also support wireless communication (e.g., 802.11a/b/g/n, WiMax). It will be apparent to those skilled in the art that the communication network interface 1108 can support many wired and wireless standards.

The optional input/output (I/O) interface 1110 is any device that receives input from the user and output data. The optional display interface 1112 is any device that is configured to output graphics and data to a display. In one example, the display interface 1112 is a graphics adapter. It will be appreciated that not all digital devices 1100 comprise either the I/O interface 1110 or the display interface 1112.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1102 and/or a co-processor located on a GPU (i.e., Nvidia).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

Figure 13:
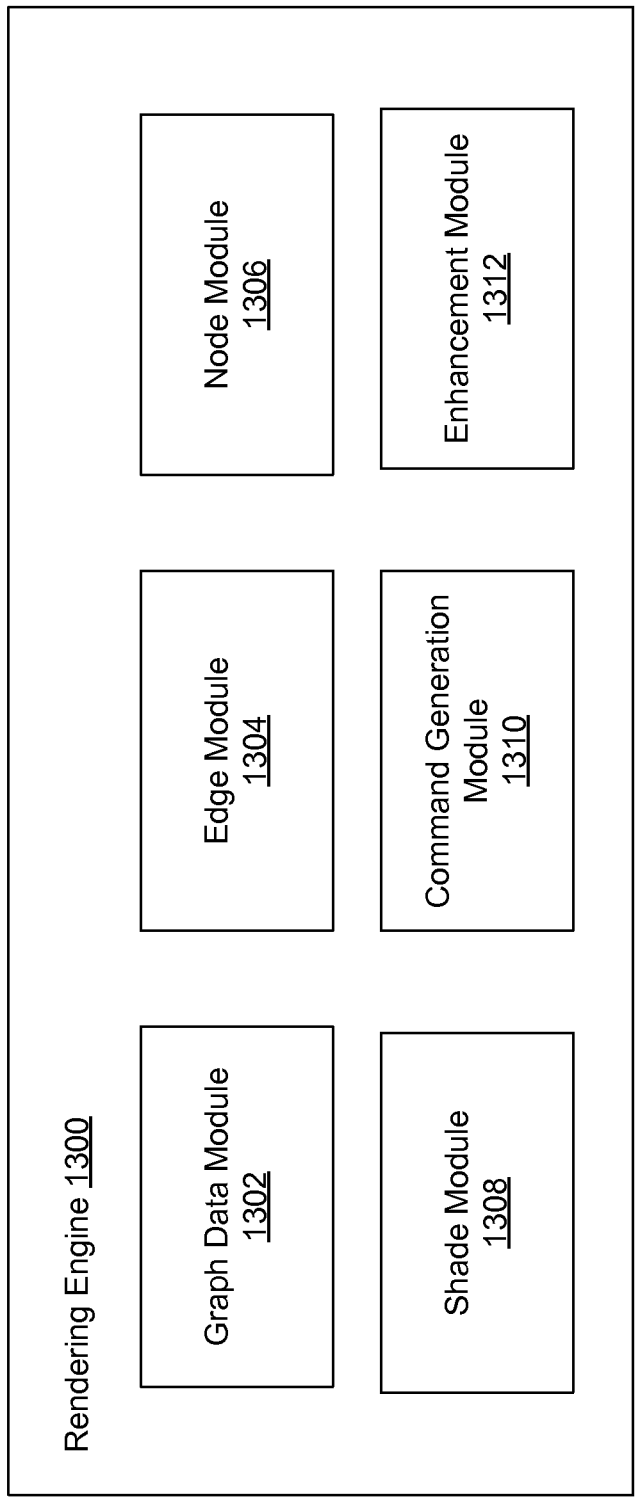
FIG. 13 is a block diagram of a rendering engine in some embodiments.

FIG. 13 is a block diagram of a rendering engine 1300 in some embodiments. The rendering engine 1300 may generate commands that are provided to a graph execution module (e.g., a graphic processing unit or GPU) to display the graph. A graph may be a visual representation of information or of relationships between quantities or sets of data. Information or a specific relationship between quantities or sets of data may be presented by the graph. The graph may comprise nodes and edges. In some embodiments, the graph may comprise nodes of different shapes, edges of different shapes, nodes of different colors, edges of different colors, node animations (e.g., pulsing, glowing or the like), edge animations, or the like.

In various embodiments, the rendering engine 1300 generates a command to draw all nodes of a graph. In one example, instead of each node being a separate mesh, the rendering engine 1300 may treat all of the nodes and/or edges as a single mesh or object. In some embodiments, the rendering engine 1300 may generate a command to draw and/or shade all of the nodes and/or edges as a single mesh or object. As a result, the process of rendering and drawing complex graphs may be computationally efficient and may be faster than systems in the prior art that draw each node and edge at a time based on separate commands.

In some embodiments, the rendering engine 1300 may generate a command to draw and/or shade all nodes and/or edges of a subgraph. A subgraph may include, for example, nodes and edges that are not coupled to another portion of the graph (e.g., the graph includes two or more subgraphs that are not coupled). In one example, the rendering engine 1300 may generate a command to draw and shade all nodes associated with a first subgraph and then generate a command to draw and shade all nodes associated with a second subgraph.

The rendering engine 1300 comprises a graph data module 1302, an edge module 1304, a node module 1306, a shade module 1308, a command generation module 1310, and an enhancement module 1312. The rendering engine 1300 may be any software, hardware, or a combination of both. The rendering engine 1300 may be configured to generate commands of a declarative nature to draw and shade nodes of a graph as a single mesh. The commands may be provided to a GPU which may draw and shade (e.g., utilizing OpenGL) the nodes based on the command. The rendering engine 1300 may be resident in a server, a user computer, or any other digital device.

The graph data module 1302 may be configured to receive graph data identifying nodes and edges of a graph. In some embodiments, the graph data may be received from the graph layout engine described herein. The graph data may comprise any number of data structures that identify edges, identify nodes, and contain positions or distances related to the display of the identified nodes. In some embodiments, the graph data comprises any number of data structures that identify edges, identify nodes, and contain positions or distances related to the display of the identified edges.

The edge module 1304 may identify the edges of the graph data received by the graph data module 1302. In some embodiments, the graph data received by the graph data module 1302 comprises an edge array index data structure (e.g., a table or database) as well as a vertex array that may be used to identify a relative position of the edges.

The node module 1306 may identify the nodes of the graph data received by the graph data module 1302. In some embodiments, the graph data received by the graph data module 1302 comprises a node array index data structure (e.g., a table or database) as well as a vertex array that may be used to identify a relative position of the nodes.

In various embodiments, the edge module 1304 and the node module 1306 buffer the index or other identifiers associated with the edges and nodes. In one example, the edge module and the node module 1306 do not identify the edges or nodes but rather buffer arrays received from the graph data module 1302. In some embodiments, the command generation module buffers the arrays received from the graph data module 1302. The edge module 1304 and the node module 1306 may be optional.

The shade module 1308 may identify shade information contained in the graph data. In some embodiments, shade information may be within a separate data structure or part of the vertex array that may be used to identify a relative position of nodes and/or edges.

Shading may be used to alter the apparent shape of a drawn object or sprite by commanding vertex and/or fragment shaders. A sprite is an image that can be moved on the screen independently of other images in the background. The GPU may display sprites that are square-shaped at every position of a node. If a ball-shaped node is preferred, the shader may alter the shade of each sprite based on the distance from the center of the sprite. For example, the shader may shade a sprite in red from the center of the sprite to a distance of a 7 unit radius and then shade all other units of the sprite outside of the radius as transparent or clear. As a result, the sprites may appear to be circular. Those skilled in the art will appreciate that many different styles of shading may be used to make a node or edge appear with more colors, different shapes, or include different graphical effects.

The command generation module 1310 may be configured to generate commands to draw and/or shade edges and nodes associated with the graph data received from the graph data module 1302. The command generation module 1310 may be configured to provide generated commands to a GPU or other display engine. In various embodiments, the command generation module 1310 generates commands to display all or parts of the graph by utilizing vertex buffer objects (VBOs).

In some embodiments, the command generation module 1310 may generate a command to draw all edges based on an edge identification array and edge position information. In one example, the command generation module 1310 generates a command to draw all edges of a graph as a single mesh or object. In various embodiments, the command generation module 1310 may generate a command to draw all nodes based on a node identification array and node position information. In one example, the command generation module 1310 generates a command to draw all nodes of a graph as a single mesh or object Those skilled in the art will appreciate that that the command generation module 1310 is not limited generating commands to drawing and/or shading all edges of a graph or all nodes of a graph. The command generation module 1310 may generate a command to draw and/or shade a plurality of nodes (i.e., a subset) of a graph or a plurality of edges of a graph. In some embodiments, the command generation module 1310 may generate a command to draw any number of edges and nodes of one or more subgraphs.

A graph may be a complete visualization of data including all depicted nodes and edges in a display. For example, FIG. 10A depicts graph 1000 which may have two subgraphs. A subgraph is a part of a graph that is not coupled by an edge or node to another part of the graph. Group 1004 of FIG. 10A is a subgraph.

In various embodiments, the edge module 1304, node module 1306, and the shade module 1308 are optional. For example, the graph data module 1302 may receive one or more data structures that may be used by the command generation module 1310 to generate commands to draw and/or shade a plurality of nodes and/or a plurality of edges.

In various embodiments, the command generation module 1310 may make a compact representation of a graph's structure, layout, and visual properties (e.g., color and/or size) by utilizing one or more vertex buffer objects (VBOs). Vertex and fragment shaders may utilize the VBOs to generate commands to display the graph in a computationally efficient, scalable, and fast manner without relying on advanced or state-of-the-art hardware.

In some embodiments, each of the two shaders is a program that is sent to a GPU that may run on every node and edge. In one example, the vertex shader runs on each vertex. The nodes may be one vertex and edges may be two vertexes. The fragment shader may run on each pixel that would be outputted to the screen (on both nodes and edges).

In various embodiments, the graph data module 1302 receives graphic data. The following is exemplary pseudocode in which the graph data module 1302 and/or the command generation module 1302 may initialize buffers with information received from the graph data.

```
//BUFFER INITIALIZATION
//
// NOTE: each buffer's id has already been generated with a call to
glGenBuffers
// Node Index Array (Array A) is an index of nodes
glBindBuffer(GL_ELEMENT_ARRAY_BUFFER, nodeIndexBufferId);
glBufferData(GL_ELEMENT_ARRAY_BUFFER, INT_SIZE *
numNodes, nodeIndicesBuffer, GL_STATIC_DRAW);
// Edge Index Array (Array B) is an index of edges
glBindBuffer(GL_ELEMENT_ARRAY_BUFFER, edgeIndexBufferId);
glBufferData(GL_ELEMENT_ARRAY_BUFFER, INT_SIZE *
numEdges * 2, edgeIndicesBuffer, GL_STATIC_DRAW);
```

-continued

```
// Shared 2D Vertex Array (Array C) identifies vertices (e.g., positions of
nodes and/or edges)
glBindBuffer(GL_ARRAY_BUFFER, vertexBufferId);
glBufferData(GL_ARRAY_BUFFER, 2 * FLOAT_SIZE * numNodes,
verticesBuffer, GL_DYNAMIC_COPY);
glVertexPointer(VERTEX_DIM, GL_FLOAT, 0, 0);
// Node Color Array (Array D) identifies colors associated with one or
more nodes
glBindBuffer(GL_ARRAY_BUFFER, colorBufferId);
glBufferData(GL_ARRAY_BUFFER, COLOR_DIM * FLOAT_SIZE *
numNodes, colorsBuffer, GL_DYNAMIC_DRAW);
glColorPointer(COLOR_DIM, GL2.GL_FLOAT, 0, 0);
// Node Extras Array (Array E) identifies animations, pulsations, or
other enhancements
glBindBuffer(GL_ARRAY_BUFFER, extraBufferId);
glBufferData(GL_ARRAY_BUFFER, NORMAL_DIM * FLOAT_SIZE *
numNodeExtras, extrasBuffer, GL_DYNAMIC_DRAW);
glNormalPointer(GL_FLOAT, 0, 0);
```

In some embodiments, the graph data module 1302 receives a node index array (e.g., Array A), edge index array (e.g., Array B), and shared 2D vertex array identifying positions of nodes and/or edges (e.g., Array C). Exemplary Arrays A, B, and C are further discussed with regard to FIG. 14.

The graph data module 1302 may also receive a node color array (Array D) and a node extras array (Array E). The node color array may indicate colors and shading for one or more nodes and/or one or more arrays. In one example, the color for a first node may define the shape of the node from a previously existing structure such as a sprite or other graphical object. By altering the shading based on a displayed position, one or more nodes may be depicted to appear as any shape, color, or combination of colors.

The enhancement module 1312 is configured to identify enhancements or extras that may be displayed in the graph. For example the enhancement module 1312 may identify and/or buffer extras that indicate that one or more nodes or graphs will pulsate or glow. Further enhancements include, but are not limited to smoothing effects, textures, hue changes, color variations, animations, color or color intensity that changes over time, or the like. In some embodiments, the command generation module 1310 buffers an array or other data structure related to one or more enhancements of the graph. The enhancement module 1312 may be optional.

The node extras array may indicate enhancements such as, but not limited to, animations, pulses, or feathering (e.g., similar to anti-aliasing). The node extras array may enhance balls and/or edges of the graph.

In various embodiments, the graph data module 1302 and/or the command generation module 1310 may fill one or more buffers. The following is pseudocode for filling a buffer:

```
//FILLING A BUFFER (example is Array C)
glBindBuffer(GL_ARRAY_BUFFER, vertexBufferId);
vertexBuffer = glMapBuffer(GL_ARRAY_BUFFER, GL_WRITE_ONLY);
for (int i=0; i<numNodes; i++) {
    float[ ] nodePos = getNodePos(i);
    vertexBuffer.put(nodePos[0]); // X coordinate
    vertexBuffer.put(nodePos[1]); // Y coordinate
}
glUnmapBuffer(GL_ARRAY_BUFFER)
```

As discussed herein, the command generation module 1310 may generate a command to draw a plurality of edges. Exemplary pseudocode for drawing the edges is as follows:

```
//DRAWING THE GRAPH
// 1. Draw Edges
glEnableClientState(GL_VERTEX_ARRAY);
glBindBuffer(GL_ARRAY_BUFFER, vertexBufferId);
    // Bind shared vertex data
glBindBuffer(GL_ELEMENT_ARRAY_BUFFER, edgeIndexBufferId); //
Bind edge indices
glDrawElements(GL_LINES, numEdges * 2, GL_UNSIGNED_INT, 0); //
Draw all edges
```

In various embodiments, the command generation module 1310 may make simple calls to an OpenGL application (e.g., an application that utilizes the OpenGL language to display objects or the like) associated with a graphic engine such as a GPU. The calls command the GPU to perform actions based on information previously loaded in the buffer to draw a plurality of edges of a the graph. In various embodiments, the call to draw the edges (i.e., glDrawElements(GL_LINES, numEdges*2, GL_UNSIGNED_INT, 0);) draws all edges of the graph or all edges of a subgraph as a mesh or other object.

As discussed herein, the command generation module 1310 may generate a command to draw a plurality of nodes. Exemplary pseudocode for drawing the nodes is as follows:

```
// 2. Draw Nodes (over edges)
glEnable(GL_POINT_SPRITE);
    // Allow points to be rendered as Point Sprites
glEnable(GL_VERTEX_PROGRAM_POINT_SIZE);
    // Allow the vertex shader to size individual points
glEnableClientState(GL_COLOR_ARRAY);
    // Bind the color array
glBindBuffer(GL_ARRAY_BUFFER, colorBufferId);
glEnableClientState(GL_NORMAL_ARRAY);
    // Bind the "extra" array as vertex normals
glBindBuffer(GL_ARRAY_BUFFER, extraBufferId);
glEnableClientState(GL_VERTEX_ARRAY);
    // Bind the vertex data
glBindBuffer(GL_ARRAY_BUFFER, vertexBufferId);
glBindBuffer(GL_ELEMENT_ARRAY_BUFFER, nodeIndexBufferId); //
Bind the edge indices
glDrawElements(GL_POINTS, numNodes, GL_UNSIGNED_INT, 0); //
Draw all nodes
```

In various embodiments, the command generation module 1310 may make calls to command the GPU to perform actions based on information previously loaded in the buffer to draw a plurality of nodes of a the graph. In various embodiments, the command generation module 1310 may command the GPU to place point sprites at the positions of the plurality of nodes. The point sprites may be modified to make the node appear the desired size, and color. Further the point sprites may be modified to appear with desired enhancements.

In some embodiments, the call to draw the edges (i.e., glDrawElements(GL_POINTS, numNodes, GL_UNSIGNED_INT, 0);) draws all nodes of the graph or all nodes of a subgraph as a mesh or other object.

The command generation module 1310 may generate a command to shade a plurality of nodes and/or edges. Exemplary pseudocode for shading is as follows:

```
uniform float zoomDistance;
varying float nodeSize;
void vertexShader( ) {
    if (currentlyRendering == NODES) {
        vertexColor = baseVertexColor;
        // normal vector X contains the size of the node, which scales with
the camera distance
        pointSize = max(normalVector.x*(1.0/zoomDistance),
NODE_MIN_DIAM)*2.0;
        nodeSize = pointSize/2.0;
    }
    else if (currentlyRendering == EDGES)
        vertexColor = dimColorBy(baseVertexColor, 0.7);
    // normal vector Y == 1.0 signifies vertex is selected
    if (normalVector.y == 1.0)
        vertexColor = selectedColor;
    // normal vector Z == 1.0 signifies vertex is pinned (visually dimmed)
    if (normalVector.z == 1.0)
        vertexColor = dimColorBy(vertexColor, 0.5);
}
void fragmentShader( ) {
    vec2 fragCoord = getFragmentScreenCoord( );
    vec2 vertexCoord = getVertexScreenCoord( );
    float distanceFromCenter = distance(fragCoord, vertexCoord) *
zoomDistance;
    if (currentlyRendering == NODES)
        fragColor = getColorFromRadialGradient(distanceFromCenter,
nodeSize, vertexColor);
    else if (currentlyRendering = EDGES)
        fragColor = getColorFromLinearGradient(distanceFromCenter,
vertexColor);
}
```

In various embodiments, the command generation module 1310 may make calls to command the GPU to perform actions based on information previously loaded in the buffer to shade nodes and/or edges. The command generation module 1310 identifies one or more points associated with a position of a node or edge. For example, the command generation module 1310 may identify a radius about the center of a point sprite (e.g., the center of a node) and command that the shader shade the area between the center of the point sprite and the edge of the radius a first color (e.g., red). The command generation module 1310 may also command that the shader shade the area outside the radius to the edge of the point sprite a transparent color thereby commanding the depiction of the desired color, shape, and size of one or more nodes. Similarly, the command generation module 1310 may identify a point in the center of an edge and command the shader to color or enhance the edge. For example, the command generation module 1310 may command the shader to begin "feathering" or providing a texture based on a point that is a predetermined distance from the center of the edge. The command generation module 1310 may further command that the shader transparently color any point beyond a second predetermined distance from the center of the edge. As a result, the width, color, and sharpness (e.g., anti-aliasing) of one or more edges and/or one or more nodes may be controlled.

Those skilled in the art will appreciate that the rendering engine 1300 may generate a command to draw all of the edges of a graph or subgraph. The rendering engine 1300 may also generate a command to draw all of the nodes of a graph or subgraph. In various embodiments, the rendering engine 1300 may generate a command to shade all nodes or shade all edges. The rendering engine 1300 may, in some embodiments, generate a command to draw and shade all nodes of a graph or subgraph or all edges of a graph or subgraph. Moreover, those skilled in the art will appreciate that the rendering engine 1300 may generate a command to draw and shade nodes and edges.

FIG. 14 is a diagram of a node index array, and edge index array, and a shared 2D vertex array that may be used by the rendering engine in some embodiments. As discussed and depicted in FIG. 14, Array A may contain a node index array which indexes nodes of a graph. In one example as depicted in FIG. 14, five nodes are indexed 0-4. The node's number may correspond to the index of the node's 2D vetex in Array C.

Array A may be bound with Array C and passed to glDrawElements to be drawn as the GL_POINTS primitive shape.

Array B may contain a node index array which indexes edges of a graph. In one example as depicted in FIG. 14, there are four edges. Each successive pair of numbers in Array B may correspond to one edge. Thus, the edges may be (0,1), (0,2), (0,3), and (0,4). Each number in an edge's ordered pair may correspond to the 2D vertex index in Array C of each node that the edge connects. This array may be bound with Array C and passed to glDrawElements to be drawn as the GL_LINES primitive shape.

Array C may contain a shared 2D vertex Array. Array C may be a flattened array of 2D vertices. Each successive pair of numbers in Array C may correspond to the ordered (x, y) position of a node in the graph. This array may be stored in fast GPU memory and may be referenced by both the node and edge index arrays (i.e., Array A and Array B) to relatively quickly and efficiently draw large graphs.

Although three arrays are depicted in FIG. 14, those skilled in the art will appreciate that there may be any number of arrays. In one example, one array may comprise Array A, Array B, and/or C. Further, additional arrays may include color and extras.

As discussed with regard to FIG. 13, the command generation module 1310 may be configured to initialize and fill buffers. In one example, the command generation module 1310 may:
(a) fill the node position buffer (i.e., Array C) with our positions from the graph data;
(b) fill the edge index buffer (i.e., Array B) with the node indices for the start and edge of each edge in the graph; and
(c) fill the node index buffer (i.e., Array A) with the indices corresponding to each node (e.g., in the range from 0 to num_nodes−1).

The command generation module 1310 may further:
(a) generate a command to the GPU to use the vertex and fragment shaders;
(b) generate a command to the GPU to use Array C as vertices;
(c) generate a command to the GPU to draw edges utilizing Array B as indices and generate the drawElements command; and
(d) generate a command to the GPU to draw nodes utilizing Array A as indices and generate the drawElements command.

In various embodiments, if positions are updated (e.g., due to animation or layout changes), the command generation module 1310 may remap Array C and fill the array with new positions.

Figure 15:
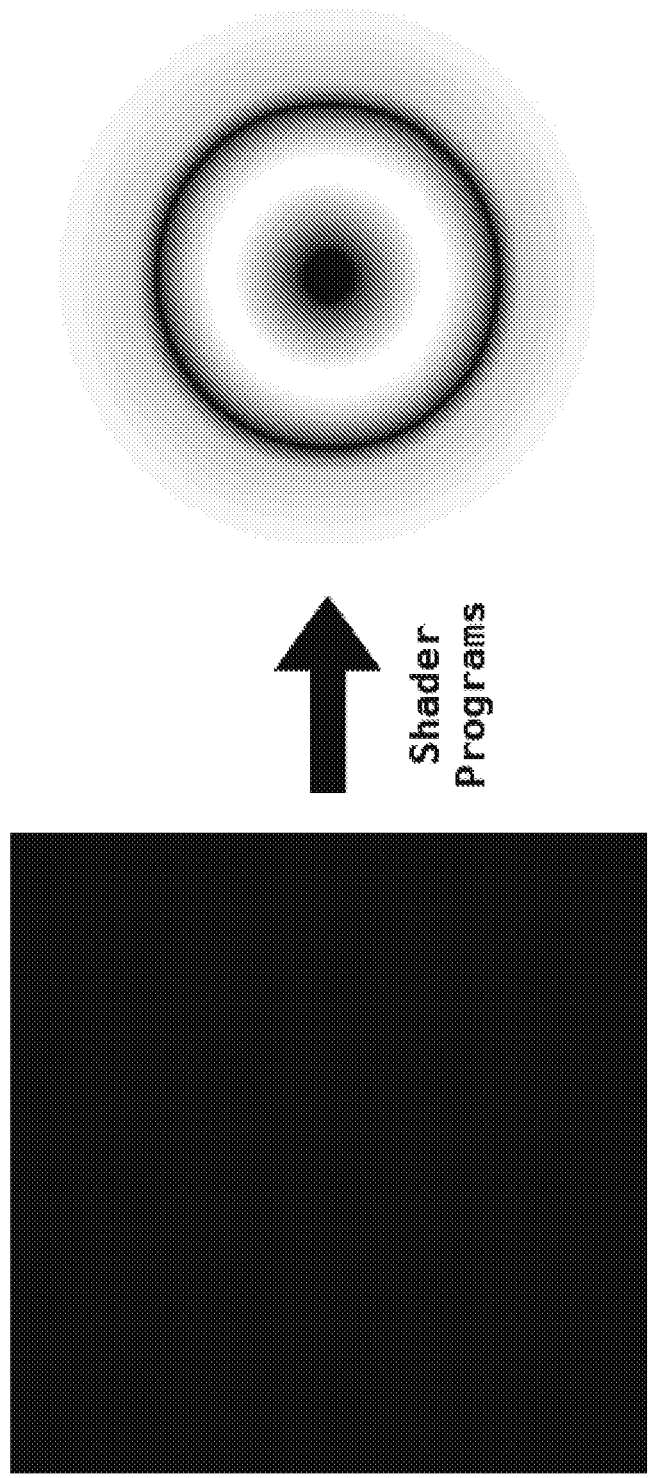
FIG. 15 is a diagram depicting a process of node shading in some embodiments.

FIG. 15 is a diagram depicting a process of node shading in some embodiments. FIG. 15 depicts an OpenGL point sprite depicted as a square. The shader may adjust the color and design of one or more point sprites. The command generation module 1310 may generate one or more commands to shade one or more point sprites in a manner depicted in FIG. 15. For example, the command generation module 1310 may command the shader to color at least one point sprite a color (e.g., orange) between the center of the point sprite and a first predetermined radius. The same command may also command the shader to fill a transparent color between the first predetermined radius and a second predetermined radius thereby making the center of the point sprite appear circular. The same command may further command the shader to fill a third color between the second predetermined radius and a third predetermined radius. Moreover, the same command may further command the shader to transparently color all other portions of the point sprite(s) beyond the third predetermined radius. Those skilled in the art will appreciate that there may be any number of commands to color all or parts of point sprites. The point sprites may be drawn in the position of nodes as a single mesh or as separate meshes.

In this example, a visual representation of a node may be designed thereby allowing control of the depiction of size, shape, color, texture, and design of the node. Those skilled in the art will appreciate that any type of design and/or colors may be used to depict one or more nodes. Further, in some embodiments, one or more different commands may be used to color different portions of the same node.

Figure 16:
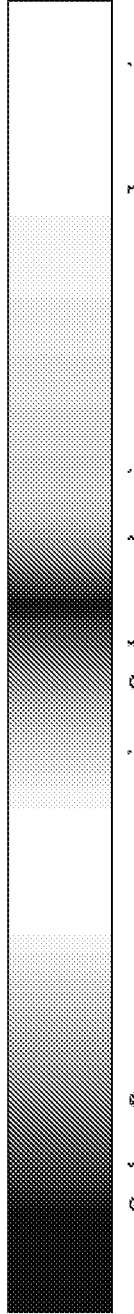
FIG. 16 is a diagram depicting a custom radial gradient of a node for a shader in some embodiments.

FIG. 16 is a diagram depicting a custom radial gradient of a node for a shader in some embodiments. In FIG. 16, a custom radial gradient for designing the node as depicted in FIG. 15 is demonstrated. In this example, black is considered to be the node color while white is considered to be a transparent color. Those skilled in the art will appreciate that any color or combination of colors may be used.

For example, the command generation module 1310 may generate one or more commands to color one or more nodes based in part on the distance from the center of the point sprite(s). The placement of color as well as the type of color may be a part of one or more arrays (e.g., the color array and the extras array). As a result of the design and use of colors, enhancements may be included including pulsating colors at different positions of the point sprite, creating glowing effects, and the like.

In one example, the shader is instructed to color the point sprite either white or black depending upon distance from the center of the point sprite. The outer ring may glow or a background color (e.g., white) may glow, pulsate, or the like.

Although FIG. 16 describes controlling shading based, at least in part, on the distance from the center of the point sprite, those skilled in the art will appreciate that the shading may be controlled in any way. For example, the shading may be performed based, at least in part, on the distance from the outer edge of the point sprite or relative to any position.

Figure 17:
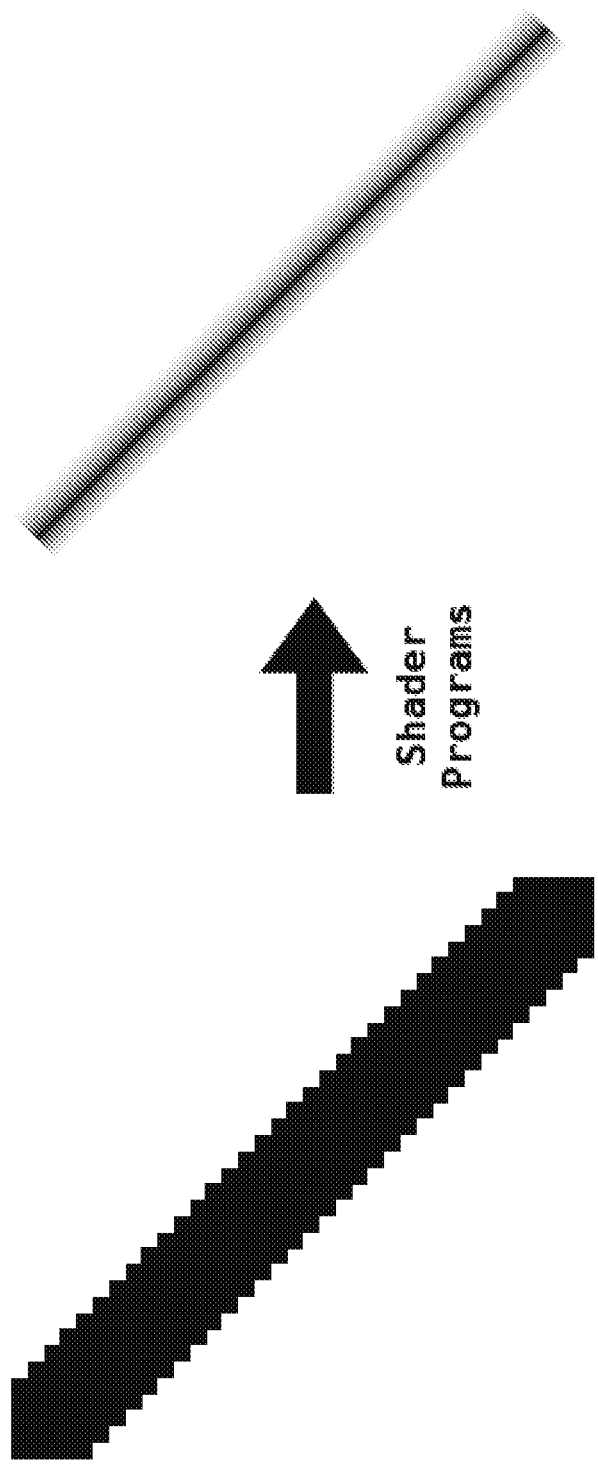
FIG. 17 is a diagram depicting a process of smoothing edges and/or other depicted objects in some embodiments.

FIG. 17 is a diagram depicting a process of smoothing edges and/or other depicted objects in some embodiments. In some embodiments, the command generation module 1310 may generate one or more commands using shading information to feather, texture, or produce other anti-aliasing-like effects. In some embodiments, jagged monochromatic lines may be colored and/or shaded by the shader to create smooth lines and/or edges with additional effects. The process is further discussed with regard to FIG. 18.

Figure 18:
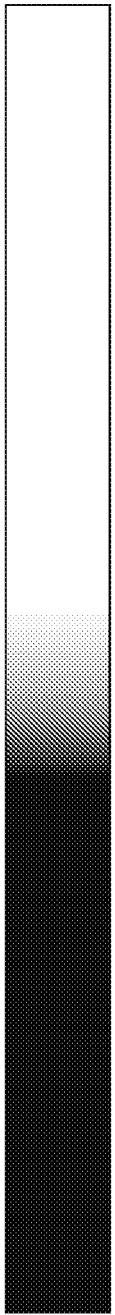
FIG. 18 is a diagram depicting a custom linear gradient of an edge for a shader in some embodiments.

FIG. 18 is a diagram depicting a custom radial gradient of an edge for a shader in some embodiments. In FIG. 18, a custom radial gradient for designing the edge to remove jagged portions as depicted in FIG. 17 is demonstrated. In this example, black is considered to be the base interpolated fragment color while white is considered to be a transparent color. In various embodiments, other colors or a fine granularity of color combinations may be used to smooth transitions and create other effects (e.g., feathering). Those skilled in the art will appreciate that any color or combination of colors may be used.

In this example, the command generation module 1310 may generate one or more commands to color one or more edges based in part on the distance from the center of the line(s). In some embodiments, the shader may color a node black from the center of the node to a first predetermined distance from the center. The shader may use a different color (e.g., gray) or a combination of colors (e.g., black and white) in a textured pattern between the first predetermined distance and a second predetermined distance from the center. After the second predetermined distance to the rest of the edge, the shader may color the edge white (e.g., transparent). As a result, a smooth transition may be displayed which may be visually appealing and may efficiently eliminate or reduce aliasing.

The placement of color as well as the type of color may be a part of one or more arrays (e.g., the color array and the extras array). As a result of the design and use of colors, enhancements may be included including anti-aliasing-like effects. Further effects, such as pulsating colors at different positions of the edge, creating glowing effects, and the like may also be implemented.

In one example, the shader is instructed to color the edge either white or black depending upon distance from the center of the edge. In some embodiments, the outer ring may glow or a background color (e.g., white) may glow, pulsate, or the like.

Although FIG. 18 describes the shading as being controlled, at least in part, based on the distance from the center of the edge, those skilled in the art will appreciate that the shader may be controlled in any way. For example, the shader may be controlled based, at least in part, on the distance from the outer portion of the edge or relative to any position.

In various embodiments, color may be set on a per-vertex (per node) basis. As a result, edge coloring may be automatically generated by interpolating two colors of the nodes that the edge connects. Those skilled in the art will appreciate that the aesthetically pleasing edge coloring may help the user understand the different regions of the graph that the edge spans.

Figure 19:
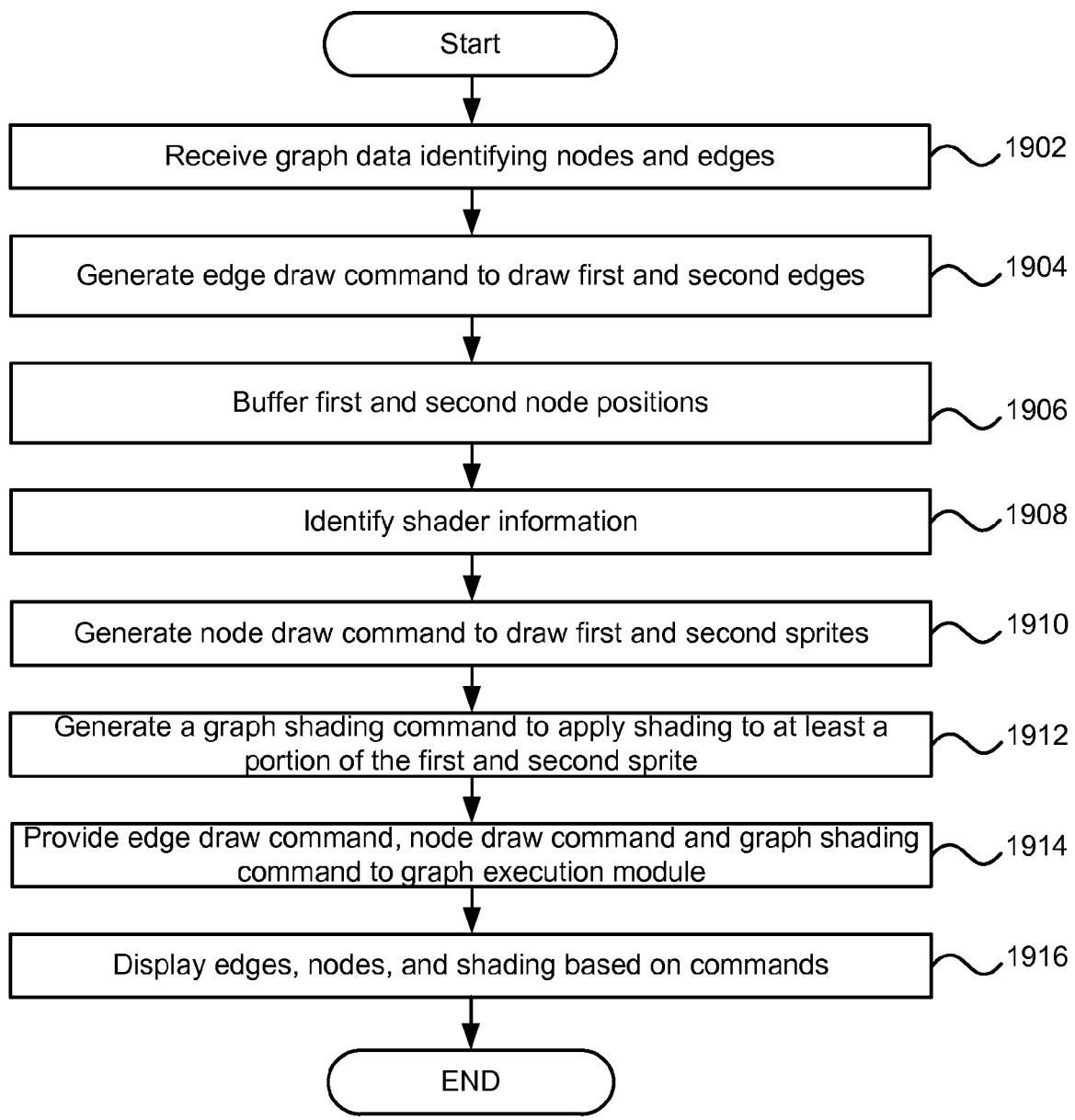
FIG. 19 is a flow chart of an exemplary method to generate commands to display a graph in some embodiments.

FIG. 19 is a flow chart of an exemplary method to generate commands to display a graph in some embodiments. In step 1902, the graph data module 1302 receives graph data identifying nodes and edges. In various embodiments, the graph data module 1302 receives graph data from a graph layout engine 600, file, or any source. The graph data may comprise a set of arrays or any other data structure(s) that identifies positions (e.g., relative positions) of nodes and arrays.

In step 1904, the command generation module 1310 generates an edge draw command to draw first and second edges. The edges may be a part of a single display object such as a mesh. The edge draw command may be provided to a graph execution module (e.g., GPU) which may draw the edges. In some embodiments, the edge draw command may be a command to draw all edges of the graph as a part of a single display object. In various embodiments, the edge draw command may be a command to draw all the edges of a subgraph as a part of a single display object.

In step 1906, the command generation module 1310 buffers the first and second node positions, respectively. In some embodiments, the command generation module 1310 identifies the node positions from the received graph data (e.g., from a node index array and a position array) and/or buffers the data within a memory. The memory may be a GPU memory or any kind of memory.

In step 1908, the command generation module 1310 identifies shader information. The shader information may indicate the color and design of nodes and edges. In some embodiments, the shader information may indicate shading, coloring, and/or texturing based on one or more distances (e.g., Euclidean distance as may be displayed in the graph) relative to an edge or node. In one example, the shader information may indicate shading, coloring, and/or texturing based on the distance from the center of the edge or node. Those skilled in the art will appreciate that shading, coloring, and/or texturing may be based relative to any position.

In step 1910, the command generation module 1310 generates a node draw command to draw first and second sprites in positions associated with the positions of first and second nodes. In one example, the sprites may be point sprites programmable through OpenGL. Those skilled in the art will appreciate that the node draw command is not limited to sprites but may be any object or combination of objects. For example, the nodes may be a part of a single mesh or may be separate objects.

In step 1912, the command generation module 1310 generates a graph shading command to apply shading to at least a portion of the first and second sprite. In various embodiments, the graph shading command is a command to apply a color to a sprite or a combination of colors. In some embodiments, the graph shading command may apply colors and transparency to different portions of the sprite to display different apparent shapes and add effects (e.g., glowing or pulsating nodes).

In step 1914, the command generation module 1310 provides the edge draw command, the node draw command, and the graph shading command to the graph execution module (e.g., GPU). In some embodiments, the node draw command and the graph shading command may be a part of the same command. In various embodiments, the edge draw command and the node draw command are part of the same command. In further embodiments, the edge draw command, the node draw command, and the graph shading command are part of the same command.

In step 1916, the graph execution module displays the edges, nodes, and shading based on one or more of the received commands.

Figure 20:
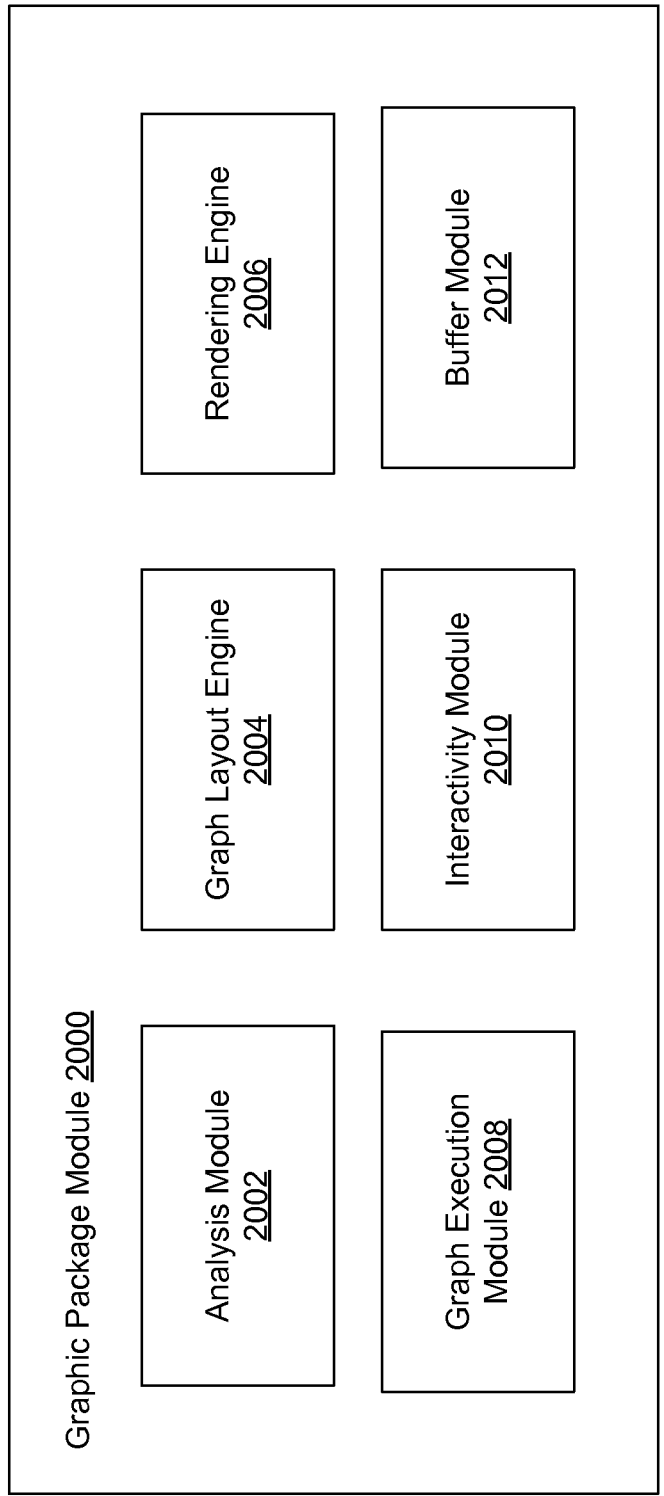
FIG. 20 is a block diagram depicting a graphic package module where a graph layout module may communicate with the rendering engine in some embodiments.

FIG. 20 is a block diagram depicting a graphic package module 2000 where a graph layout engine 2004 may communicate with the rendering engine 2006 in some embodiments. The graph package module 2000 may be software, hardware, or a combination of software and hardware. In some embodiments, the graph package module 2000 resides on one or more digital devices. The graph package module 2000 may be configured to analyze data, generate data structures of nodes and edges based on the analyzed data, determine the initial layout and the layout over time, generate commands to display the graph, and display the graph. In some embodiments, the layout and display may be controlled or altered based on user interaction.

The graph package module 2000 may comprise an analysis module 2002, a graph layout engine 2004, a rendering engine 2006, a graph execution module 2008, an interactivity module 2010, and a buffer module 2012. The analysis module 2002 may analyze data to generate one or more data structures of nodes and edges. The analysis module 2002 may analyze the topology of the data and/or utilize any other form of mathematics and/or statistics to assess a data set. The data set may be of any size and contain any number of dimensions.

The graph layout engine 2004 may be similar to the graph layout engine 600 depicted in FIG. 6. The graph layout engine 600 may determine an initial layout of the nodes and edges identified by the analysis module 2002. The graph layout engine 600 may further determine a position of the nodes and edges over time.

The rendering engine 2006 may receive the graphic data from the graph layout engine 2004 and may render the graph (e.g., generate the commands to draw one or more nodes and edges. The rendering engine 2006 may be similar to the rendering engine 1300.

The graph execution module 2008 may be any graphical processing unit (GPU) or combination of GPUs configured to receive the commands from the rendering engine 2006 and display graph. In one example, the graph may contain any number of nodes and edges. The graph execution module 2008 may also apply shading for different colors, sizes, and effects.

The interactivity module 2010 may receive user input regarding the graph and provide information regarding changes in position of one or more nodes and/or edges. For example, a user may select and move a subset of nodes and edges. The interactivity module 2010 may identify the new positions of the moving subset and provide the information to the buffer module 2012, graph layout engine 2004, and/or the rendering engine 2006.

In one example, the interactivity module 2010 provides the new positions to the buffer module 2012 which may provide the new positions to the rendering engine 2006. The rendering engine 2006 may then generate commands to the graph execution module 2008 to display the movement. If the new position of the selected subset conflicts or otherwise does not match information provided by the graph layout engine 2004, the rendering engine 2006 may override or ignore information previously received from the graph layout engine 2004 in favor of the user's actions.

The graph layout engine 2004 may also receive the new positions from the buffer module 2012. The graph layout engine 2004 may then recalculate forces of one or more parts of the graph based on the user's action and provide new positions to the rendering engine 2006 which may attempt to render the new user chosen positions as well as the newly calculated positions from the graph layout engine 2004. If the user continues to move the selected subset or moves a different subset, the process may continue (e.g., the rendering engine 2006 ensuring that the user's actions are properly displayed and the graph layout engine determining layout changes (if any) caused by the user's action).

The buffer module 2012 may be any memory which may receive new positions of nodes and/or edges caused by user interaction, initial layouts, and/or layout over time. The buffer module 2012 may then provide the information to the graph layout engine 2004 and/or the rendering engine 2006.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
   receiving, by a processing device, graph data identifying nodes and edges to graph;
   generating, by the processing device, an edge draw command to draw at least a first and a second edge as at least a part of a display object based on the received graph data;
   buffering, by the processing device, from the received graph data, a first node position for a first sprite associated with the first node position and a second node position for a second sprite associated with the second node position;
   identifying, by the processing device, shader information associated with application of shading to at least a portion of the first sprite and at least a portion of the second sprite, the shader information indicating a change of shade based on a distance from a first position associated with the first sprite and a change of shade based on a distance from a second position associated with the second sprite;
   generating, by the processing device, a node draw command to draw at least the first and second sprites based on the buffered first and second node positions;
   generating, by the processing device, a graph shading command, based at least in part on the identified shader information, to apply shading to the at least the portion of the first sprite based, at least in part, on the distance from the first position associated with the first sprite and to apply shading to the at least the portion of the second sprite based, at least in part, on the distance from the second position associated with the second sprite; and
   providing, by the processing device, the edge draw command, the node draw command, and the graph shading command to a graph execution module.

2. The method of claim 1, further comprising displaying, by the processing device, the first and second edges based on the edge draw command, displaying the first and second sprites based on the node draw command, and displaying shading to the first and second sprites based on the graph shading command.

3. The method of claim 1, wherein the edge draw command is generated after the node draw command.

4. The method of claim 1, wherein the graph shading command is further to apply shading to at least the first edge and the second edge, the shader information further indicating a change of shade based on a distance from a first position associated with the first edge and a change of shade based on a distance from a second position associated with the second edge.

5. The method of claim 4, wherein the application of shading to the at least the first edge and the second edge produces a smoothing effect.

6. The method of claim 4, wherein the shader information indicates a first color of the change of shade associated with the first edge and a second color of the change of shade associated with the second edge, and the graph shading command is to apply the first color of the change of shade associated with the first edge and the second color of the change of shade associated with the second edge.

7. The method of claim 1, wherein the shader information indicates a first color of the change of shade associated with the first sprite and a second color of the change of shade associated with the second sprite, and the graph shading command is to apply the first color of the change of shade associated with the first sprite and the second color of the change of shade associated with the second sprite.

8. The method of claim 7, wherein the graph shading command is further to interpolate a color of the first sprite and a color of the second sprite to color at least a connecting edge.

9. The method of claim 1, wherein the shader information indicates a glowing effect of shading associated with the first sprite and the second sprite and the graph shading command is to apply the glowing effect of shading associated with the first sprite and the second sprite.

10. The method of claim 1, further comprising identifying, by the processing device, node size information from the received graph data, the node size information comprising a first size for the first node and a second size for the second node, wherein the shader information indicating the change of shade associated with the first sprite is based, in part, on the first size for the first node, and the shader information indicating the change of shade associated with the second sprite is based, in part, on the second size for the second node.

11. The method of claim 1, wherein the edge draw command is a command to draw all edges identified in the graph data.

12. The method of claim 1, wherein the graph shading command is associated with applying shading to all sprites associated with every node identified in the graph data.

13. The method of claim 1, wherein the display object is a mesh.

14. The method of claim 1, wherein the draw command and the graph shading command are the same command.

15. A system comprising:
a processor;
a memory;
a graph data module executed by the processor and configured to receive graph data identifying nodes and edges to graph; and
a command generation module executed by the processor and configured to:
generate an edge draw command to draw at least a first and a second edge as at least a part of a display object based on the received graph data;
buffer, from the received graph data, a first node position for a first sprite associated with the first node position and a second node position for a second sprite associated with the second node position;
identify shader information associated with application of shading to at least a portion of the first sprite and at least a portion of the second sprite, the shader information indicating a change of shade based on a distance from a first position associated with the first sprite and a change of shade based on a distance from a second position associated with the second sprite;
generate a node draw command to draw at least the first and second sprites based on the buffered first and second node positions;
generate a graph shading command, based at least in part on the identified shader information;
apply shading to the at least the portion of the first sprite based, at least in part, on the distance from the first position associated with the first sprite and to apply shading to the at least the portion of the second sprite based, at least in part, on the distance from the second position associated with the second sprite; and
provide the edge draw command, the node draw command, and the graph shading command to a graph execution module.

16. The system of claim 15, wherein the graph execution module is configured to display the first and second edges based on the edge draw command, to display the first and second sprites based on the node draw command, and to display shading to the first and second sprites based on the graph shading command.

17. The system of claim 15, wherein the command generation module generates the edge draw command after the node draw command.

18. The system of claim 15, wherein the graph shading command is further to apply shading to at least the first edge and the second edge, the shader information further indicating a change of shade based on a distance from a first position associated with the first edge and a change of shade based on a distance from a second position associated with the second edge.

19. The system of claim 18, wherein the application of shading to the at least the first edge and the second edge produces a smoothing effect.

20. The system of claim 18, wherein the shader information indicates a first color of the change of shade associated with the first edge and a second color of the change of shade associated with the second edge, and the graph shading command is to apply the first color of the change of shade associated with the first edge and the second color of the change of shade associated with the second edge.

21. The system of claim 15, wherein the shader information indicates a first color of the change of shade associated with the first sprite and a second color of the change of shade associated with the second sprite, and the graph shading command is to apply the first color of the change of shade associated with the first sprite and the second color of the change of shade associated with the second sprite.

22. The system of claim 15, wherein the graph shading command is further to interpolate a color of the first sprite and a color of the second sprite to color at least a connecting edge.

23. The system of claim 15, wherein the shader information indicates a glowing effect of shading associated with the first sprite and the second sprite and the graph shading command is to apply the glowing effect of shading associated with the first sprite and the second sprite.

24. The system of claim 15, wherein the shader information indicating the change of shade associated with the first sprite is based, in part, on a first size for the first node, and the shader information indicating the change of shade associated with the second sprite is based, in part, on a second size for the second node.

25. The system of claim 15, wherein the edge draw command is a command to draw all edges identified in the graph data.

26. The system of claim 15, wherein the graph shading command is associated with applying shading to all sprites associated with every node identified in the graph data.

27. The system of claim 15, wherein the display object is a mesh.

28. The system of claim 15, wherein the draw command and the graph shading command are the same command.

29. A non-transitory computer readable medium comprising instructions, the instructions being executable by a processor for performing a method, the method comprising:
receiving graph data identifying nodes and edges to graph;
generating an edge draw command to draw at least a first and a second edge as at least a part of a display object based on the received graph data;
buffering, from the received graph data, a first node position for a first sprite associated with the first node position and a second node position for a second sprite associated with the second node position;
identifying shader information associated with application of shading to at least a portion of the first sprite and at least a portion of the second sprite, the shader information indicating a change of shade based on a distance from a first position associated with the first sprite and a change of shade based on a distance from a second position associated with the second sprite;
generating a node draw command to draw at least the first and second sprites based on the buffered first and second node positions;
generating a graph shading command, based at least in part on the identified shader information, to apply shading to the at least the portion of the first sprite based, at least in part, on the distance from the first position associated with the first sprite and to apply shading to the at least the portion of the second sprite based, at least in part, on the distance from the second position associated with the second sprite; and
providing the edge draw command, the node draw command, and the graph shading command to a graph execution module.

* * * * *